(12) United States Patent
Takaki et al.

(10) Patent No.: US 8,533,769 B2
(45) Date of Patent: Sep. 10, 2013

(54) DIGITAL BROADCAST RECEIVER AND DIGITAL BROADCAST RECEIVING METHOD

(75) Inventors: Kazuya Takaki, Tokyo (JP); Keiichi Shirasuka, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 13/497,007

(22) PCT Filed: Nov. 8, 2010

(86) PCT No.: PCT/JP2010/006538
§ 371 (c)(1),
(2), (4) Date: Mar. 19, 2012

(87) PCT Pub. No.: WO2011/055554
PCT Pub. Date: May 12, 2011

(65) Prior Publication Data
US 2012/0192244 A1 Jul. 26, 2012

(30) Foreign Application Priority Data
Nov. 9, 2009 (JP) ................................. 2009-256206

(51) Int. Cl.
*H04N 7/173* (2011.01)
(52) U.S. Cl.
USPC ............ 725/131; 725/100; 725/139; 725/151
(58) Field of Classification Search
USPC ................. 725/100, 131, 139, 151; 455/436, 455/438–439
See application file for complete search history.

(56) References Cited

U.S. PATENT DOCUMENTS

| 7,792,498 B2* | 9/2010 | Tsfaty et al. | 455/88 |
| 2002/0166128 A1* | 11/2002 | Ikeda et al. | 725/112 |
| 2006/0156209 A1 | 7/2006 | Matsuura et al. | |
| 2006/0181652 A1* | 8/2006 | Hagiwara | 348/732 |
| 2007/0094696 A1* | 4/2007 | Sakai | 725/118 |
| 2009/0150967 A1* | 6/2009 | Chen et al. | 725/153 |

FOREIGN PATENT DOCUMENTS

| JP | 2000-138566 A | 5/2000 |
| JP | 2001-53635 A | 2/2001 |
| JP | 2001-168684 A | 6/2001 |
| JP | 2003-152578 A | 5/2003 |
| JP | 2005-204121 A | 7/2005 |

(Continued)

*Primary Examiner* — Mulugeta Mengesha
(74) *Attorney, Agent, or Firm* — Birch, Stewart, Kolasch & Birch, LLP

(57) ABSTRACT

A digital broadcast receiver includes an affiliated station storage unit that stores affiliated station information in which broadcasting stations are associated with information identifying affiliated stations of the broadcasting stations and reception service areas to which the affiliated stations broadcast, and a switching history storage unit that stores switching history information in which each reception service area is associated with information identifying other reception service areas; when the signal of the program being viewed/listened to becomes currently unreceivable, a tuning control unit identifies, from the switching history information, another reception service area to which switching was performed from the reception service area to which the broadcasting station broadcasting the program being viewed/listened to is broadcasting, determines an affiliated station in the identified other reception service area that is an affiliated station of the broadcasting station broadcasting the program being viewed/listened to, and tunes to the identified affiliated station.

12 Claims, 24 Drawing Sheets

(56) References Cited

FOREIGN PATENT DOCUMENTS

| | | |
|---|---|---|
| JP | 2005-277727 A | 10/2005 |
| JP | 2005-311921 A | 11/2005 |
| JP | 2006-12144 A | 1/2006 |
| JP | 2006-67489 A | 3/2006 |
| JP | 2006-157440 A | 6/2006 |
| JP | 2006-184093 A | 7/2006 |
| JP | 2006-186701 A | 7/2006 |
| JP | 2006-311249 A | 11/2006 |
| JP | 2007-129389 A | 5/2007 |
| JP | 2007-235434 A | 9/2007 |
| JP | 2007-259053 A | 10/2007 |
| JP | 2007-318717 A | 12/2007 |
| JP | 2008-17204 A | 1/2008 |
| JP | 2008-35538 A | 2/2008 |
| JP | 2008-211288 A | 9/2008 |
| JP | 2008-263504 A | 10/2008 |
| JP | 2009-5006 A | 1/2009 |

\* cited by examiner

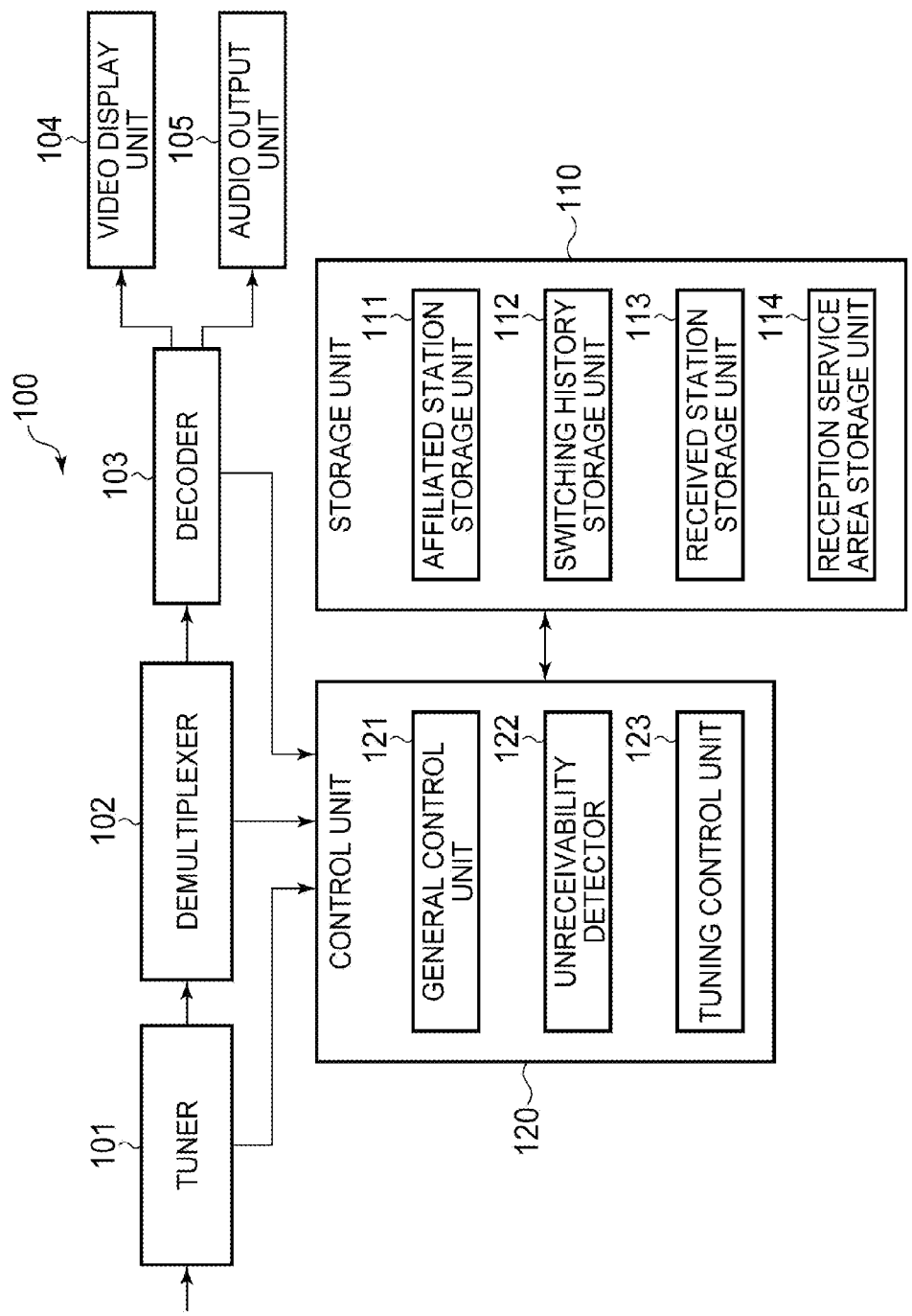

| BROAD-CASTING STATION (111b) | AFFILIATED STATION LIST (111c) | | | | | |
|---|---|---|---|---|---|---|
| STATION α (REGION A) | STATION α (REGION B) | STATION α (REGION C) | STATION α (REGION D) | STATION α (REGION E) | STATION α (REGION F) | ... |
| STATION β (REGION A) | STATION β (REGION B) | STATION β (REGION C) | STATION β (REGION G) | | ... | |

| PRESENT POSITION (112b) | MOTION HISTORY (←HIGHER PRIORITY   LOWER PRIORITY→) (112c) | | | | | |
|---|---|---|---|---|---|---|
| REGION A | REGION B | REGION E | REGION C | ... | REGION G | ... |
| REGION B | REGION C | ... | | | REGION A | ... |
| REGION C | REGION B | REGION D | ... | | | |
| ⋮ | ⋮ | | | | | |

FIG.8

| AFFILIATION INFORMATION | AFFILIATED STATION LIST | | | | | |
|---|---|---|---|---|---|---|
| STATION α | STATION α (REGION B) | STATION α (REGION C) | STATION α (REGION D) | STATION α (REGION E) | STATION α (REGION F) | ... |
| STATION β | STATION β (REGION B) | STATION β (REGION C) | STATION β (REGION G) | | ... | |

FIG.11

| REGION | ADJACENT REGION | | | |
|---|---|---|---|---|
| REGION A | REGION B | REGION C | REGION E | |
| REGION B | REGION A | REGION D | REGION E | |
| REGION C | REGION A | REGION D | REGION E | |
| REGION D | REGION B | REGION C | REGION E | |
| REGION E | REGION A | REGION B | REGION C | REGION D |
| ⋮ | ⋮ | | | |

DIGITAL BROADCAST RECEIVER AND DIGITAL BROADCAST RECEIVING METHOD

TECHNICAL FIELD

The present invention relates to technology for receiving digital broadcasts.

BACKGROUND ART

In the past, when motion of a receiver receiving a digital broadcast made reception of the program being viewed/listened to with the receiver impossible due to a drop in the receiving level etc., the viewer or listener had to perform manual operations on the receiver to scan the channels for 'broadcasting stations receivable if the present position is within their reception service areas', one station at a time, and decide whether each station had the same program content, i.e., decide whether the broadcasting station found was an 'affiliated station'. If a broadcasting station detected in the channel search did not have the same program as the program that was being viewed/listened to, it was necessary to scan the channels again and repeat the process of detecting the next broadcasting station—a troublesome procedure.

To ameliorate this troublesome procedure, a receiver disclosed in patent document 1, for example, includes a receiving unit for switchably receiving identical programs broadcast in different frequency bands in different areas, a storage unit for storing a history of the switching of the frequency bands of the program in the receiving unit, and a control unit for, when the receiver moves from one area to another area, having the receiving unit switch to receive the program broadcast in a different frequency band in accordance with the switching history stored in the storage unit. In the receiver described in patent document 1, when the receiver moves from a first area to a second area, the control unit selects a different frequency band where the same program is most likely to be broadcast in accordance with the switching history stored in the storage unit, consequently shortening the time until the receiving unit can receive the same program.

PRIOR ART REFERENCES

Patent Documents

Patent document 1: Japanese Patent Application Publication No. 2007-129389 (paras. 0010-0023, FIG. 2)

SUMMARY OF THE INVENTION

Problems to be Solved by the Invention

The receiver described in patent document 1 selects frequently-switched broadcasting stations as candidate affiliated stations, in accordance with the broadcasting station switching history, so almost no switching history is stored for broadcasting stations the broadcasts of which are viewed/listened to infrequently; therefore, when an attempt is made to view/listen to the same program by tuning to those broadcasting stations, the effect of a reduced period in which viewing or listening is impossible is not obtained.

An object of the present invention is therefore to provide a digital broadcast receiver and digital broadcast receiving method that can shorten the time taken to find a receivable affiliated station, thereby shortening the program viewing/listening interruption time.

Means for Solving the Problems

A digital broadcast receiver according to one aspect of the present invention includes: an affiliated station storage unit that, in further association with affiliated station information associating broadcasting stations with their affiliated stations, stores tuning information, obtained from broadcast signals from the broadcasting stations and the affiliated stations and needed for tuning to the respective broadcasting stations, and reception service areas to which the respective broadcasting stations are broadcasting, the reception service areas also being obtained from the broadcast signals from the broadcasting stations and the affiliated stations; a switching history storage unit for storing a motion history of past movement among the reception service areas obtained from the broadcast signals and, in association with each of the reception service areas, switching history information associated with a priority order indicating where, from a given reception service area, the digital broadcast receiver is likely to move next, based on the motion history; and a tuning control unit for tuning in one of the broadcasting stations or one of the affiliated stations in order to receive a program, and obtaining information with which the reception service area of the tuned-in broadcasting station or affiliated station can be inferred; when a received signal becomes currently unreceivable due to motion from a reception service area of a broadcasting station broadcasting a program currently being viewed/listened to to another reception service area, the tuning control unit infers, from the switching history information, a present location to which the digital broadcast receiver is likely to have moved, performs a moved-to reception service area inference process to infer a reception service area at the moved-to location, performs a receivable-in-moved-to-region affiliated station identification process to identify, from the affiliated station information for affiliated stations receivable in the moved-to region, an affiliated station of the broadcasting station broadcasting the program being viewed/listened to, which can be tuned in within the reception service area of the inferred moved-to location, and preferentially tunes to the affiliated station receivable in the moved-to region as identified by the receivable-in-moved-to-region affiliated station identification process.

The digital broadcast receiver may further include an adjacent region storage unit for storing adjacent region information in which information identifying a given reception service area is associated with information identifying other reception service areas adjacent to that reception service area, wherein: when the affiliated station receivable in the moved-to region cannot be tuned in, the tuning control unit performs an adjacent reception service area inference process to infer, on a basis of the adjacent region information, an adjacent reception service area adjacent to the reception service area of the broadcasting station broadcasting the program being viewed/listened to, performs a receivable-in-adjacent-region affiliated station identification process to identify, from the affiliated station information, an affiliated station of the broadcasting station broadcasting the program being viewed/listened to, which can be tuned in within the inferred adjacent reception service area, as an affiliated station receivable in the adjacent region, and preferentially tunes to the affiliated station receivable in the adjacent region identified by the receivable-in-adjacent-region affiliated station identification process.

In the digital broadcast receiver, when the affiliated station receivable in the moved-to region in the currently receivable state cannot be tuned in or when the receivable affiliated station in the adjacent region in the currently receivable state cannot be tuned in, the tuning control unit may perform a channel search process to detect a broadcasting station in the currently receivable state by sequentially scanning untuned channels, and when a broadcasting station in the currently receivable state found in the channel search process is not an affiliated station of the broadcasting station broadcasting the program being viewed/listened to, may perform a current reception service area inference process in which a reception service area obtained from a signal received from the broadcasting station in the currently receivable state, found in the channel search process, is inferred to be a current reception service area, may perform a receivable-in-current-region affiliated station identification process to identify, from the affiliated station information, an affiliated station of the broadcasting station broadcasting the program being viewed/listened to, which can be tuned in within the inferred current reception service area, as an affiliated station receivable in the current region, and may preferentially tune to the affiliated station receivable in the current region as identified by the receivable-in-current-region affiliated station identification process.

The digital broadcast receiver may further include a preceding reception service area storage unit for storing information indicating a reception service area broadcast to by the broadcasting station tuned in last as a preceding reception service area, wherein when, after a switch to an affiliated station, the received signal thereof becomes currently unreceivable, if the currently receivable state has not occurred even once after the switch to the affiliated station, the tuning control unit may perform a preceding reception service area boundary vicinity decision process to decide whether the current position is included in a boundary portion between the reception service area of the currently tuned-in broadcasting station and the preceding reception service area; if the preceding reception service area boundary vicinity decision process decides that the current position is included in the boundary portion, the tuning control unit may obtain the preceding reception service area from the preceding reception service area storage unit, perform a preceding receivable affiliated station identification process to identify, from the affiliated station information, an affiliated station of the tuned-in broadcasting station within the preceding reception service area as a preceding receivable affiliated station, and preferentially tune to the preceding receivable affiliated station information as identified by the preceding receivable affiliated station identification process.

A digital broadcast receiving method according to one aspect of the present invention includes: a affiliated station storage step of storing in an affiliated station storage means, in further association with affiliated station information associating broadcasting stations with their affiliated stations, tuning information needed for tuning to the broadcasting stations and the affiliated stations and reception service areas to which the respective broadcasting stations are broadcasting; a switching history storage step of storing, in a switching history storage means, a motion history of past movement among the reception service areas and, in association with each of the reception service areas, switching history information associated with a priority order indicating where, from a given reception service area, the digital broadcast receiver is likely to move next, based on the motion history; and a tuning control step of tuning to one of the broadcasting stations or one of the affiliated stations in order to receive a program, and obtaining information with which the reception service area of the tuned-in broadcasting station or affiliated station can be inferred; wherein when a received signal becomes currently unreceivable due to motion from a reception service area of a broadcasting station broadcasting a program currently being viewed/listened to to another reception service area, the tuning control step includes a step of inferring, from the switching history information, a present location to which the digital broadcast receiver is likely to have moved, a step of performing a reception service area inference process to infer a reception service area at the moved-to location, a step of performing a receivable-in-moved-to-region affiliated station identification process to identify, from the affiliated station information for affiliated stations receivable in the moved-to region, an affiliated station of the broadcasting station broadcasting the program being viewed/listened to, which can be tuned in within the reception service area of the inferred moved-to location, and a step of preferentially tuning to the affiliated station receivable in the moved-to region as identified by the receivable-in-moved-to-region affiliated station identification process.

Effect of the Invention

With the present invention, it is possible to shorten the time taken to find a receivable affiliated station, thereby shortening the program viewing/listening interruption time.

BRIEF DESCRIPTION OF THE DRAWINGS

FIG. 1 is a schematic block diagram showing the configuration of a digital broadcast receiver according to a first embodiment.

FIG. 2 is a diagram schematically showing an affiliated station information table in the first embodiment.

FIG. 3 is a diagram schematically showing a switching history information table in the first embodiment.

FIG. 8 is a diagram schematically showing a variation of the affiliated station information table in the first embodiment.

FIG. 11 is a diagram schematically showing an adjacent area information table in the second embodiment.

MODE FOR CARRYING OUT THE INVENTION

First Embodiment

Figure 4A:
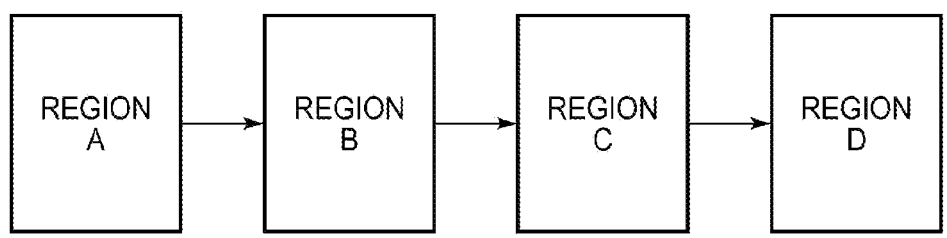
FIGS. 4(*a*) and 4(*b*) are diagrams schematically showing examples of affiliated stations selected when the digital broadcast receiver in the first embodiment moves among reception service areas.

FIG. 1 is a schematic block diagram showing the configuration of a digital broadcast receiver according to a first embodiment of the present invention. As shown in FIG. 1, the digital broadcast receiver has a tuner 101, a demultiplexer 102, a decoder 103, a video display unit 104, an audio output unit 105, a storage unit 110, and a control unit 120.

The tuner 101 receives a received signal from an antenna that receives broadcast signals sent from digital broadcast broadcasting stations. The tuner 101 performs tuning, demodulation, and error correction and outputs a TS (transport stream) to the demultiplexer 102.

The tuner 101 also receives a received signal of a digital broadcast program from a broadcasting station detected by a channel scan or a broadcasting station specified by an input means (not shown), as specified by a tuning control unit 123 which will be described later, performs tuning, demodulation, and error correction, and outputs a TS of the received signal of the selected program. The tuner 101 further outputs the received level information, received C/N ratio information, PLL lock information, frame lock information, and error rate information of the received signal to the control unit 120.

The demultiplexer 102 extracts program specific information (PSI) and service information (SI) from the TS input from the tuner 101 and saves the program information in the storage unit 110.

From the extracted PSI/SI the demultiplexer 102 also detects PID (TS Packet Identifier) values of video TS packets and audio TS packets in the TS, filters the TS by the PIDs to extract the video TS packets and audio TS packets separately, and outputs them to the decoder 103. The demultiplexer 102 also outputs PAT (Program Association Table) interruption information, PMT (Program Map Table) interruption information, TS loss of synchronization information, and TS packet loss information to the control unit 120.

The decoder 103 performs video decoding and audio decoding from the video packets and audio packets, outputs video signals decoded from the video packets to the video display unit 104, and outputs audio signals decoded from the audio packets to the audio output unit 105. The decoder 103 also outputs decoding error detection information and decoding error rate information to the control unit 120.

The video display unit 104 displays video on a screen in accordance with the video signals input from the decoder 103.

The audio output unit 105 outputs sound in accordance with the audio signals input from the decoder 103.

The storage unit 110 includes an affiliated station storage unit 111, a switching history storage unit 112, a received station storage unit 113, and a reception service area storage unit 114.

The affiliated station storage unit 111 stores affiliated station information associating broadcasting stations in specific reception service areas (regions) with their affiliated stations, which are broadcasting stations in other reception service areas (regions). For example, in the first embodiment, an affiliated station information table 111a as shown in FIG. 2 is stored.

As shown in FIG. 2, the affiliated station information table 111a includes a broadcasting station column 111b and an affiliated station list column 111c.

The broadcasting station column 111b contains information identifying broadcasting stations and reception service areas, which are regions to which the respective broadcasting stations transmit broadcast signals. Among the information obtained from a received signal, information that can uniquely distinguish the broadcasting station may be used as the information identifying the broadcasting station. For example, a service ID, a broadcasting station name, a physical channel, or a TS_ID may be used as the information identifying the broadcasting station.

Among the information obtained from the received signal, information capable of identifying the region in which the broadcasting station provides reception service may be used as the information identifying the reception service area. In the Japanese ISDB-T digital broadcast standard, for example, the value in the region identification code field obtained from the service ID may be used as the reception service area, or the value in the area_code field in the terrestrial delivery system descriptor in the NIT (Network Information Table) included in the received signal may be used. Since the values in these fields are unique values assigned to individual broadcasting stations across the country, information identifying reception service areas can be obtained by creating a table of correspondences between the assigned values and regions (region names).

In the DVB standard, a digital broadcast standard in Europe, the original_network_id and network_id, for example, can also be used as information identifying reception service areas.

For example, 'station α (region A)' in the broadcasting station column 111b indicates a broadcasting station identified as 'station α' broadcasting in a reception service area identified as 'region A'.

The affiliated station list column 111c lists information identifying stations that are affiliated with the broadcasting stations and reception service areas identified in the broadcasting station column 111b, and reception service areas (regions) to which the affiliated broadcasting stations transmit broadcast signals. An affiliated station here means a broadcasting station related by broadcasting the same program as a given broadcasting station.

When, in the affiliated station list column 111c, there are a plurality of affiliated stations that broadcast in the same reception service area, priorities are assigned to the plurality of broadcasting stations. For example, in the affiliated station list column 111c of the affiliated station information table 111a shown in FIG. 2, the broadcasting station on the left has higher priority. In the first embodiment, natural numbers starting from 1 are assigned to priority levels in such a manner that a higher number indicates a lower priority level, although the present invention is not limited to this type of numbering.

The priorities of the broadcasting stations may be determined by using the channel information of the broadcasting stations, such as the order of physical channels, and may also be determined from past viewing/listening records. For example, the broadcasting stations may be prioritized on the basis of the order in which they have been tuned in recently, the priority levels rising in order from the broadcasting station that was tuned in most recently. Alternatively, the number of times the broadcasting stations have been tuned in recently may be stored in the affiliated station storage unit 111, and the priority levels may rise in order from the broadcasting station that has been tuned in most frequently. Priorities may also be determined by means other than the methods described above.

The affiliated station information table 111a may be created beforehand and stored in the affiliated station storage unit 111, together with information determining priorities, or the tuning control unit 123, which will be described later, may, for example, obtain information (channel information, for example) identifying the station broadcasting the program being viewed/listened to, together with the reception service area information of the broadcasting station, and when an affiliated station of the station broadcasting the program being viewed/listened to is detected in a channel scan, may store the information (channel information, for example) identifying the affiliated station in the affiliated station information table 111a, associating the information to indicate the affiliation relationship with the obtained information identifying the station broadcasting the program being viewed/listened to.

The tuning control unit 123, which will be described later, may calculate the priority levels each time an affiliated station is tuned in and tune to a high-priority affiliated station according to the result as described above, or the priority levels may be calculated in advance and reflected in the affiliated station information table 111a in FIG. 2. For example, the amount of priority calculation needed to find and tune to an affiliated station can be reduced by performing a process such as arranging items in the affiliated station list column 111c in descending order of priority beforehand. The affiliated station storage unit 111 also stores information identifying the frequency band of each broadcasting station (affiliated station).

Referring again to FIG. 1, the switching history storage unit 112 stores switching history information identifying a reception service area in which a program was viewed/listened to and reception service areas to which the receiver has moved from this reception service area. In the first embodiment, for example, a switching history information table 112a like the one shown in FIG. 3 is stored in the switching history storage unit 112.

As shown in FIG. 3, the switching history information table 112a has a present position column 112b and a motion history column 112c.

Information identifying a reception service area in which a program was viewed/listened to is stored in the present position column 112b.

Information identifying a reception service area to which the receiver has moved from the reception service area indicated in the present position column 112b while a program was being viewed/listened to is stored in the motion history column 112c. Information identifying a plurality of reception service areas may be stored in the motion history column 112c, in which case the reception service areas are prioritized. For example, in the switching history information table 112a shown in FIG. 3, the reception service area on the left has higher priority. In the first embodiment, natural numbers starting from 1 are assigned to priority levels in such a manner that a higher number indicates a lower priority level, although the present invention is not limited to this type of numbering.

Priority may be based on the tuning information of the last several tuning operations, for example, so that priority in increases in order of time, from the reception service area that was moved to most recently, or priority may be based on past tuning history, increasing in order from the reception service area that was moved to most often. The reception service area (region) in which a broadcast was viewed/listened to most recently may keep the highest priority unconditionally until the receiver moves to another reception service area (region).

In FIG. 3, the priority of each associated pair of moved-from and moved-to regions (reception service areas) is determined, and the information is stored in the switching history storage unit 112 in association with the moved-from region, but the present embodiment is not limited to a scheme of this type. For example, the priority of just the moved-to region may be determined, and detailed history information may be stored in association with the 'moved-from', 'moved-to', and 'subsequent' regions.

Information identifying the broadcasting station that broadcast the program that was viewed/listened to is stored in the received station storage unit 113. Information identifying the reception service area of the broadcasting station that broadcast the program that was viewed/listened to is stored in the reception service area storage unit 114.

Referring again to FIG. 1, the control unit 120 includes a general control unit 121, an unreceivability detector 122, and a tuning control unit 123.

The general control unit 121 controls the overall processing in the digital broadcast receiver.

In a digital broadcast receiver that is mounted on a mobile object such as a vehicle or is carried around, for example, since the reception location of the digital broadcast receiver moves, the reception location may come to be outside the service area of the station broadcasting the program being viewed/listened to, or may be subject to such effects as blocking or attenuation of the carrier signal by terrestrial structures, making it impossible to receive the broadcast from the station broadcasting the program being viewed/listened to; the unreceivability detector 122 detects such unreceivable states.

The unreceivability detector 122 receives received level information, received C/N ratio information, PLL lock information, frame lock information, and error rate information of the received signal input from the tuner 101, PAT interruption information, PMT interruption information, TS loss of synchronization information, and TS packet loss information input from the demultiplexer 102, and decoding error detection information and decoding error rate information input from the decoder 103; when it decides from this information that the received signal is in a 'currently unreceivable state' or in a 'currently nearly unreceivable state' that just precedes the 'currently unreceivable state', the unreceivability detector 122 decides that the received signal is unreceivable and outputs an unreceivability notification to the tuning control unit 123.

The unreceivability detector 122 decides here from the content of the various information it has received, or from the number of occurrences of the various information or the relationship between values indicated by the various information and corresponding thresholds, whether the 'currently unreceivable state' or the 'currently nearly unreceivable state' obtains.

The tuning control unit 123 stores information (e.g., channel information) identifying the station broadcasting the program being viewed/listened to in the received station storage unit 113. The tuning control unit 123 also stores information identifying the reception service area of the station broadcasting the program being viewed/listened to in the reception service area storage unit 114.

When an unreceivability notification is received from the unreceivability detector 122, the tuning control unit 123 obtains from the reception service area storage unit 114 information identifying the reception service area in which the program was, until just now, being received. The tuning control unit 123 then obtains information identifying a reception service area to which the receiver is likely to move, in accordance with the priorities in the motion history column 112c of the record having the obtained reception service area in the present position column 112b in the switching history information table 112a. From the obtained information identifying the reception service area to which the receiver is likely to move and the information identifying the broadcasting station stored in the received station storage unit 113, the tuning control unit 123 then finds whether or not, in the affiliated station storage unit 111, there is an affiliated station of the broadcasting station broadcasting the program being viewed/listened to until just now in the reception service area to which the receiver is likely to move, and if such an affiliated station is present, decides whether the signal received from the affiliated station is receivable. If it is receivable, the tuning control unit 123 commands the tuner 101 to view/listen to the program broadcast by the affiliated station that has been found to be receivable; if it is unreceivable, the tuning control unit 123 commands the tuner 101 to make a channel scan for another affiliated station.

Figure 4B:
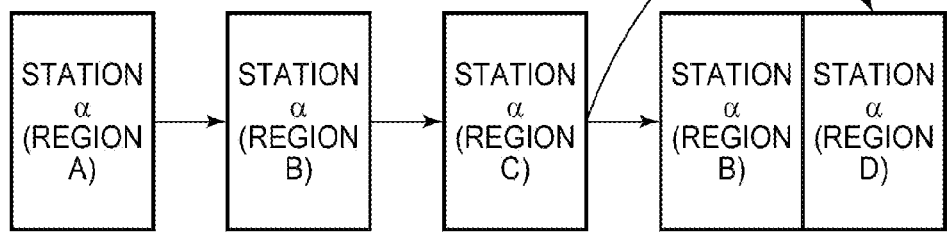

FIGS. 4(a) and 4(b) are diagrams schematically showing examples of affiliated stations selected when the digital broadcast receiver moves among reception service areas. FIG. 4(a) shows examples of reception service areas to which the digital broadcast receiver moves, and FIG. 4(b) shows examples of affiliated stations selected when the digital broadcast receiver moves as shown in FIG. 4(a).

First, suppose that in the reception service area of 'region A' indicated in FIG. 4(a), the digital broadcast receiver 100 is viewing or listening to a program from 'broadcasting station α (region A)' indicated in FIG. 4(b).

When the digital broadcast receiver moves from the reception service area of 'region A' to the reception service area of the 'region B' shown in FIG. 4(a), it exits the reception service area of 'broadcasting station α (region A)', the broadcasting station that was being viewed/listened to until just now, and at a certain location, the broadcast becomes unreceivable. When this occurs, in the switching history information table 112a, the tuning control unit 123 identifies a record 'region A' is stored in the present position column 112b and obtains 'region B', the high-priority reception service area to which the receiver is likely to move, from the motion history column 112c of the identified record. In the affiliated station information table 111a, the tuning control unit 123 further identifies a record in which 'broadcasting station α (region A)', which was being viewed/listened to until just now, is stored in the broadcasting station column 111b, selects 'station α (region B)' as an affiliated station that can be tuned in within 'region B', the reception service area to which the receiver is likely to move, from the affiliated station list column 111c of the identified record, and gives the tuner 101 a tuning command.

The tuning control unit 123 performs the same type of processing when the receiver moves from region B to region C, then to region D (moving among regions B, C, and D in the stated order). When the receiver moves from region C to region D (moving among regions C and D in the stated order), for example, region B is obtained as a region to which the receiver is likely to move, from the motion history column 112c of region C, which can be obtained from the switching history information table 112a shown in FIG. 3. The affiliated station information obtained from the affiliated station information table 111a shown in FIG. 2 is therefore 'station α (region B)', and the tuning control unit 123 first tunes to 'station α (region B)'. Since the actual position of the receiver is in region D as shown in FIG. 4(b), however, tuning ends in failure. Then, from the switching history information table 112a, the tuning control unit 123 obtains region D as the region to which the receiver is next most likely to move from the region C; the affiliated station information obtained next from the affiliated station information table 111a is 'station a (region D)', and by tuning to that station, viewing/listening becomes possible.

When reception becomes impossible due to motion of the digital broadcast receiver, the digital broadcast receiver searches for and tunes to an affiliated station in accordance with a motion history, as described above, so if the motion history and affiliated station information are stored in advance, viewing of/listening to the same program can continue without making a channel scan.

Figure 5:
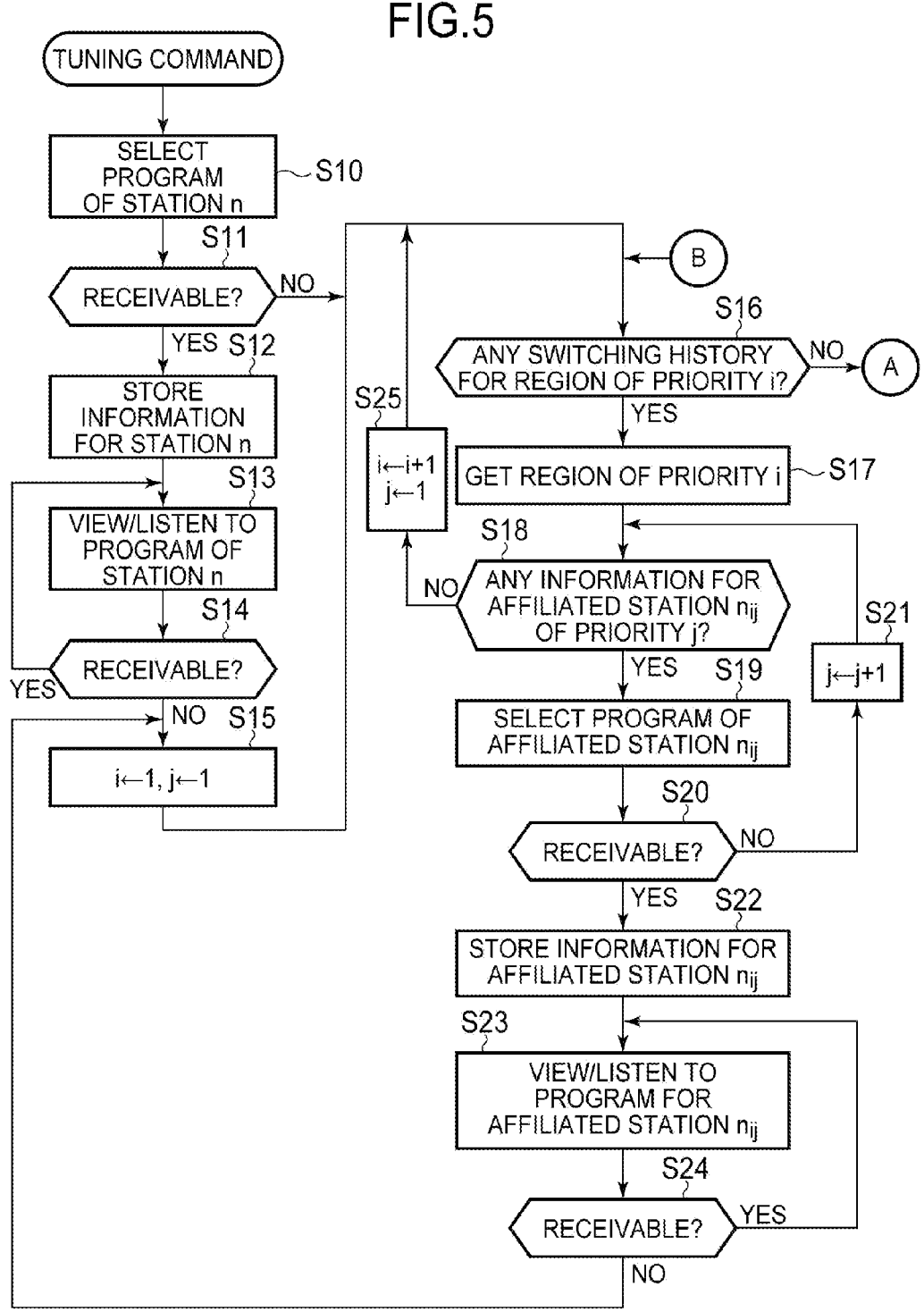
FIG. 5 is the first part of a flowchart illustrating processing in the tuning control unit in the first embodiment.
Figure 6:
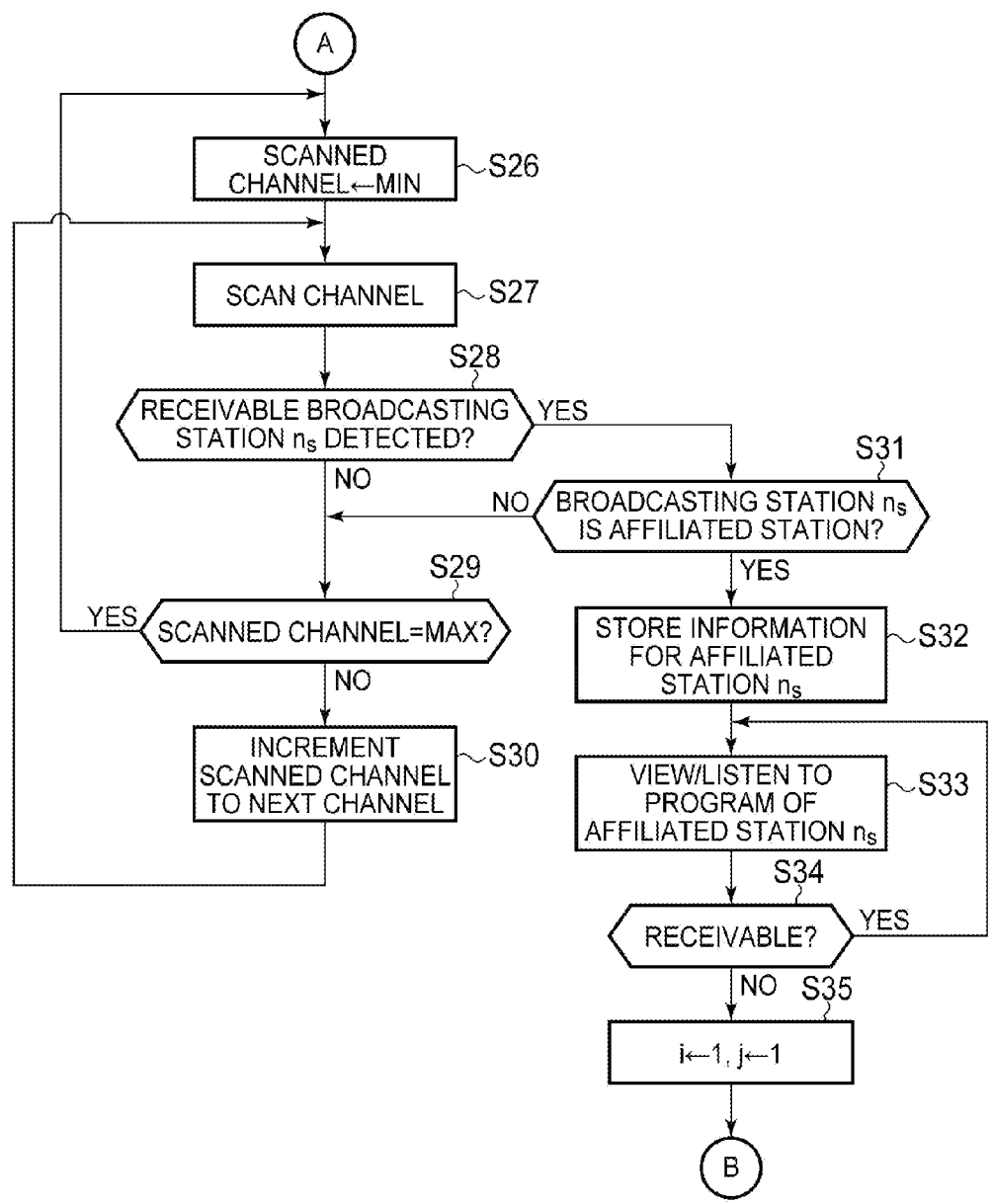
FIG. 6 is the second part of a flowchart illustrating processing in the tuning control unit in the first embodiment.

FIGS. 5 and 6 form a flowchart illustrating processing in the tuning control unit 123 of the digital broadcast receiver.

It is assumed that the digital broadcast receiver is first requested to tune to a broadcasting station n by an external operation. When this occurs, the tuning control unit 123 executes tuning on the requested broadcasting station n (step S10) and decides whether a signal is receivable from the tuned broadcasting station (step S11). If broadcasting station n is in the 'currently receivable state' (Yes in step S11), the tuning control unit 123 advances the processing to step S12; if broadcasting station n is not in the 'currently receivable state' (No in step S11), the processing proceeds to step S16.

In step S12, the tuning control unit 123 obtains information identifying broadcasting station n and information identifying the reception service area of broadcasting station n from the received signal, stores the obtained information identifying broadcasting station n in the received station storage unit 113, and stores the obtained information identifying the reception service area of broadcasting station n in the reception service area storage unit 114. By staying tuned to broadcasting station n, the tuning control unit 123 enables the user of the digital broadcast receiver to view/listen to the program broadcast by broadcasting station n (step S13).

When an unreceivability notification is received from the unreceivability detector 122, the tuning control unit 123 decides that the 'currently receivable state' does not obtain (No in step S14) and advances the processing to step S15.

In step S15, the tuning control unit 123 initializes an index i indicating the priority level of the reception service area and an index j indicating the priority level of the affiliated broadcasting station to 1.

The tuning control unit 123 then obtains the information stored in the reception service area storage unit 114 identifying the reception service area of the broadcasting station, identifies a record containing the obtained information identifying the reception service area in the present position column 112b in the switching history information table 112a in the switching history storage unit 112, and checks whether information identifying a reception service area having the priority indicated by index i is stored in the motion history column 112c of the identified record (step S16). If information identifying a reception service area having the priority indicated by index i is stored (Yes in step S16), the tuning control unit 123 advances the processing to step S17; if information identifying a reception service area having the priority level indicated by index i is not found (No in step S16), the processing proceeds to step S26 in FIG. 6.

In step S17, from the switching history information table 112a, the tuning control unit 123 obtains information specifying the reception service area obtained in step S16, having the priority level indicated by index i.

The tuning control unit 123 then obtains the information identifying the broadcasting station stored in the received station storage unit 113 and the information identifying the reception service area stored in the reception service area storage unit 114, identifies a record in the affiliated station information table 111a stored in the affiliated station storage unit 111 in which information identifying the obtained broadcasting station and the reception service area of the broadcasting station is stored in the broadcasting station column 111b, and checks the affiliated station list column 111c of the identified record for an affiliated station $n_{ij}$ that is a broadcasting station corresponding to the reception service area obtained in step S17 and has the priority level indicated by index j (step S18). If there is such an affiliated station $n_{ij}$ (Yes in step S18), the tuning control unit 123 advances the processing to step S19. If there is no such affiliated station $n_{ij}$ (Yes in step S18), the tuning control unit 123 increments the index i indicating the priority level of the reception service area by 1, initializes the index j indicating the priority level of the affiliated broadcasting station to 1 (step S25), and returns the processing to step S16.

The tuning control unit 123 then executes tuning on the affiliated station $n_{ij}$ obtained in step S18 (step S19) and decides whether the received signal from the tuned affiliated station $n_{ij}$ is receivable (step S20).

If the affiliated station $n_{ij}$ is in the 'currently receivable state' (Yes in step S20), the tuning control unit 123 advances the processing to step S22. If the affiliated station $n_{ij}$ is not in the 'currently receivable state' (No in step S20), the tuning control unit 123 increments the index j indicating the priority level of the affiliated broadcasting station by 1 (step S21) and returns the processing to step S18.

In step S22, the tuning control unit 123 stores information identifying the affiliated station $n_{ij}$ in the received station storage unit 113 and stores information identifying the reception service area of the affiliated station $n_{ij}$ in the reception service area storage unit 114. By staying tuned to affiliated station $n_{ij}$, the tuning control unit 123 enables the user of the digital broadcast receiver to view/listen to the program broadcast by affiliated station $n_{ij}$ (step S23).

When an unreceivability notification is received from the unreceivability detector 122, the tuning control unit 123 decides that the 'currently receivable state' does not obtain (No in step S24) and advances the processing to step S15.

In step S16 described above, if information identifying a reception service area having the priority level indicated by index i is not found (No in step S16), the tuning control unit 123 advances the processing to step S26 in FIG. 6 and sequentially scans the entire band of reception frequencies to search for a channel with an affiliated broadcasting station.

In step S26 in FIG. 6, the tuning control unit 123 commands the tuner 101 to set the scanned channel at the channel with the minimum value in the band. The tuning control unit 123 then scans this channel (step S27).

The tuning control unit 123 checks whether or not a receivable broadcasting station $n_s$ is detected by the channel scan (step S28). If a receivable broadcasting station $n_s$ is not detected (No in step S28), the tuning control unit 123 advances the processing to step S29; if a receivable broadcasting station $n_s$ is detected (Yes in step S28), the processing proceeds to step S31.

In step S29, the tuning control unit 123 checks whether or not the channel scanned in step S27 is the channel with the maximum value in the band. If the scanned channel is the channel with the maximum value in the band (Yes in step S29), the tuning control unit 123 returns the processing to step S26. If the scanned channel is not the channel with the maximum value in the band (No in step S29), the tuning control unit 123 moves the scanned channel up by one (+1) (step S30) and then returns the processing to step S27.

In step S28 above, if a broadcasting station $n_s$ is detected by the channel scan (Yes in step S28), the tuning control unit 123 checks whether or not the detected broadcasting station $n_s$ is in the same affiliation as the broadcasting station stored in the received station storage unit 113 (step S31). If it is not in the same affiliation (No in step S31), the tuning control unit 123 advances the processing to step S29; if it is in the same affiliation (Yes in step S31), the processing proceeds to step S32.

In the Japanese ISDB-T digital broadcast standard, the tuning control unit 123 can decide whether the broadcasting station is in the same affiliation by, for example, checking the affiliation_ID field value in the BIT (Broadcaster Information Table, which specifies the broadcaster group and the broadcaster-group SI transmission parameters etc.) section detected by the demultiplexer 102; if the program being viewed/listened to and the program broadcast by the found broadcasting station have the same value, the broadcasting stations can be judged to be in the same affiliation. For DVB (Digital Video Broadcasting), which is a European digital broadcast standard, whether or not they have a MFN relationship can be determined from the centre_frequency value included in the frequency list descriptor in which the NIT section is transmitted or the transposer_frequency value included in the cell_frequency_list descriptor; alternatively, a decision as to whether or not the same service is being broadcast may be made by checking by use of the method of detecting agreement of at least some one value in the PSI and SI detected by the demultiplexer 102, such as agreement of the service name in the SDT section, or agreement of the ts_id or sv_id, or both the ts_id and sv_id, in the NIT, SDT, or PAT section.

In step S32, the tuning control unit 123 obtains information identifying broadcasting station $n_s$ and information identifying the reception service area of broadcasting station $n_s$ from the received signal, stores the obtained information identifying broadcasting station $n_s$ in the received station storage unit 113, and stores the obtained information identifying the reception service area of broadcasting station $n_s$ in the reception service area storage unit 114. By staying tuned to affiliated station $n_s$, the tuning control unit 123 enables the user of the digital broadcast receiver to view/listen to the program broadcast by broadcasting station $n_s$ (step S33).

When an unreceivability notification is received from the unreceivability detector 122, the tuning control unit 123 decides that the 'currently receivable state' does not obtain (No in step S34) and advances the processing to step S35.

In step S35, the tuning control unit 123 initializes the index i indicating the priority level of the reception service area and the index j indicating the priority level of the affiliated broadcasting station to 1. The tuning control unit 123 then returns the processing to step S16 in FIG. 5.

With the art described in patent document 1 above, when the program being viewed/listened to is judged unreceivable (No in step S14), tuning is switched preferentially to a station to which tuning has frequently been switched from the station broadcasting the program, in accordance with broadcasting station switching history information created beforehand.

Adequate broadcasting station switching history information cannot be created for affiliated stations that have never been switched to or broadcasting stations with a low viewing/listening frequency, so proper detection of an affiliated station in the 'currently receivable state' becomes impossible. The entire receiving frequency band must then be scanned to find a channel with an affiliated station, so the effect of shortening the program viewing/listening interruption time is not obtained.

In the first embodiment, however, when a program being viewed/listened to becomes unreceivable (No in step S14), first the switching history is used to identify the region in which tuning is to be carried out, and an affiliated station having a reception service area in that region is tuned in, so detection of a currently receivable affiliated station in the current location can be carried out on affiliated stations that have never been switched to (tuned to) or broadcasting stations with a low viewing/listening frequency. Even in these cases, that is, it becomes unnecessary to scan the entire receiving frequency band to find a channel with an affiliated station, and consequently the program viewing/listening interruption time can be shortened.

In the first embodiment described above, the tuning control unit 123 detects an affiliated station that can be viewed/listened to in the current region by querying the affiliated station storage unit 111 and switching history storage unit 112, but some type of association may be created between information stored in the affiliated station storage unit 111 and switching history storage unit 112.

Figure 7:
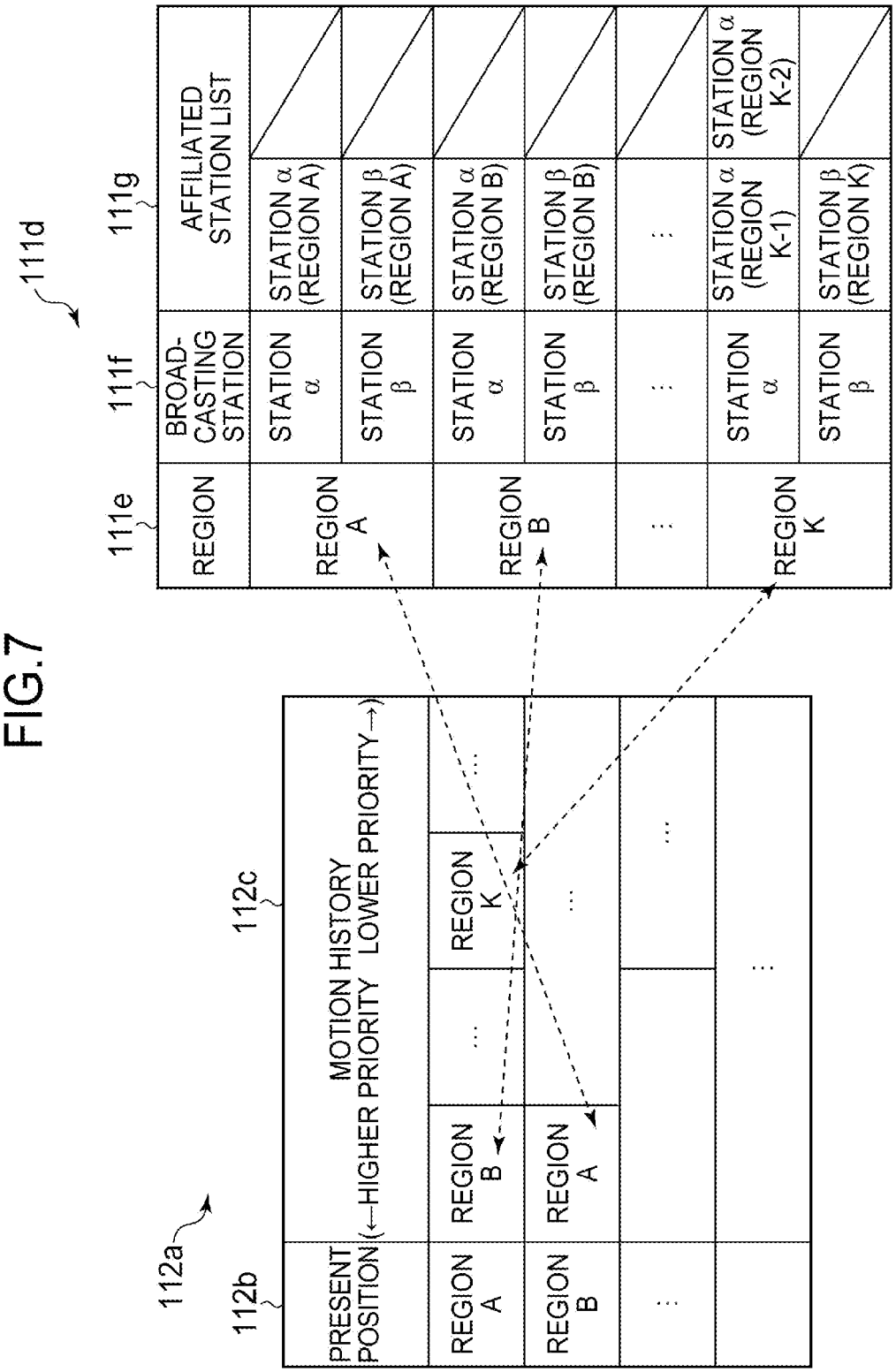
FIG. 7 is a diagram schematically showing the affiliated station information table and switching history information table in a variation of the first embodiment.

Let the affiliated station information table 111d stored in the affiliated station storage unit 111 be, for example, table information having a region column 111e, a broadcasting station column 111f, and an affiliated station list column 111g as shown in FIG. 7, where the region column 111e stores regions that enter the 'currently receivable state'. Associating (linking) the regions with priorities assigned in the switching history storage unit 112 to regions stored in the region column 111e of the affiliated station information table 111d then makes it possible to reduce the number of candidates to be searched through to find a broadcasting station that is currently receivable in the affiliated station storage unit 111, and the time needed for the search can be shortened. Moreover, the information stored in the affiliated station storage unit 111 and the switching history storage unit 112 can be collected in a single area by storing the priority order of the regions in the affiliated station information table 111d.

In the first embodiment described above, the affiliated station information stored in the affiliated station storage unit 111 stores records of individual broadcasting stations as shown in FIG. 2, but the storage area can be reduced by, for example, putting the records of affiliated broadcasting stations together as shown in FIG. 8 (which schematically shows an affiliated station information table 111h).

As illustrated, the affiliated station information table 111h includes an affiliation information column 111i and an affiliated station list column 111j. Information indicating a broadcasting station affiliation relationship is stored in the affiliation information column 111i. The value in the affiliation_ID field in the BIT (Broadcaster Information Table, which specifies the broadcaster group and the broadcaster-group SI transmission parameters etc.) section in the Japanese ISDB-T digital broadcast standard, which is detected by the demultiplexer 102 and was used to determine affiliation relationships in the channel scan described above, may be stored as the information indicating the individual broadcasting stations' affiliation relationship.

Information identifying broadcasting stations related by the affiliation identified in the affiliation information column 111i and reception service areas (regions) to which these broadcasting stations transmit broadcast signals is stored in the affiliated station list column 111j.

Figure 9:
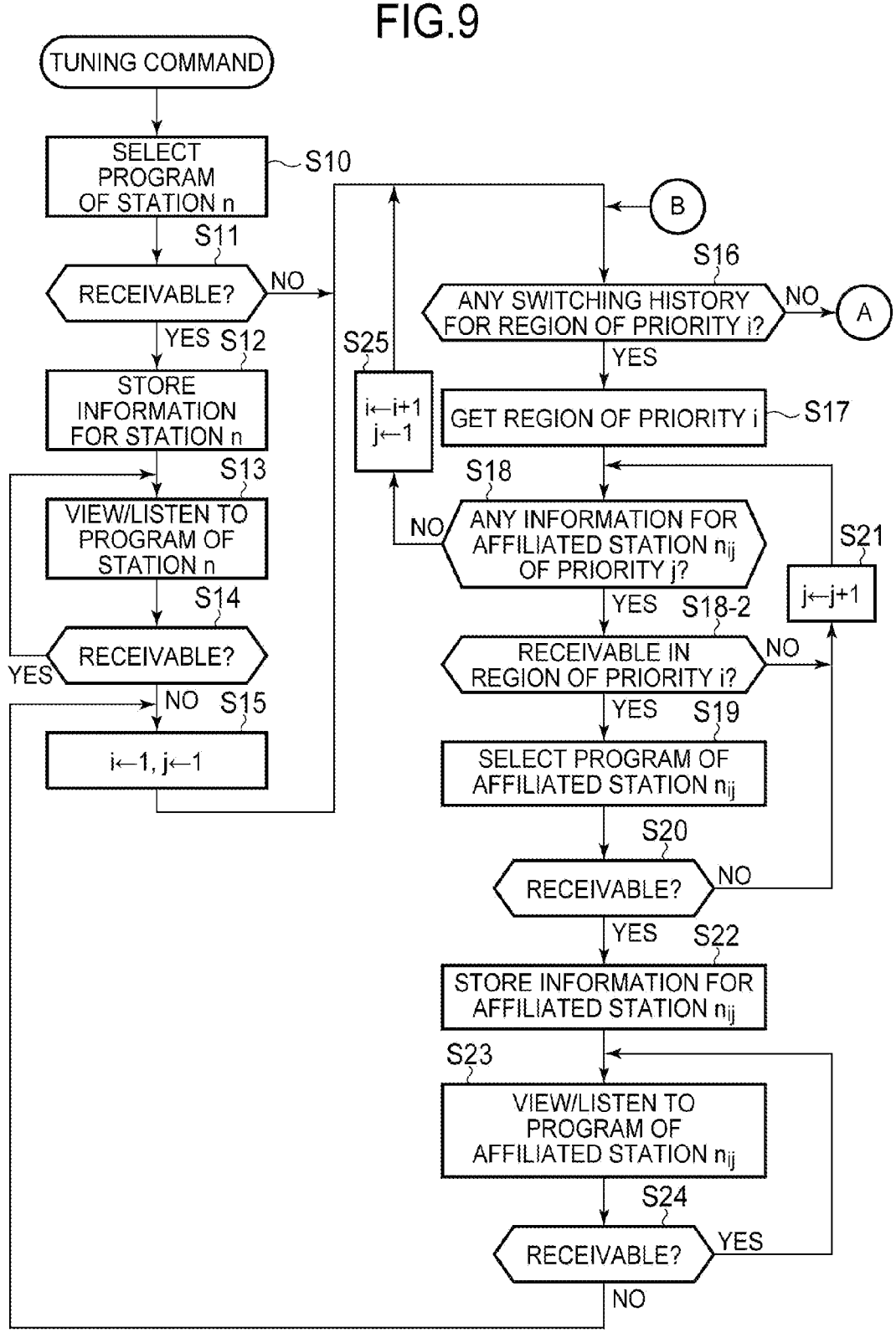
FIG. 9 is a flowchart illustrating a variation of the processing in the tuning control unit in the first embodiment.

FIG. 9 shows a flowchart illustrating the processing when an affiliated station information table 111h like the one shown in FIG. 8 is stored in the affiliated station storage unit 111. The flowchart in FIG. 9 differs from the flowchart shown in FIG. 5 in that step S18-2 is added; matters related to step S18-2 will be described below.

In step S18 in FIG. 9, the tuning control unit 123 identifies in the affiliated station information table 111h a record having affiliation information corresponding to the affiliation information of broadcasting station n in the affiliation information column 111i, identifies, from the identified record, the list of stations affiliated with broadcasting station n in column 111j, and decides whether or not there is information for an affiliated station $n_j$ corresponding to index j. If information for such an affiliated station $n_{ij}$ is present (Yes in step S18), the processing proceeds to step S18-2; if information for such an affiliated station $n_{ij}$ is not present (No in step S18), the processing proceeds to step S21. When information for such an affiliated station $n_{ij}$ is present (Yes in step S18), the tuning control unit 123 may advance the processing to step S19 to see whether tuning is actually possible.

In step S18-2, the tuning control unit 123 obtains the reception service area of the affiliated station $n_j$ from the affiliated station list column 111j and decides whether the obtained reception service area is identical to the region (reception service area) found in step S17.

When the obtained area is determined to be identical to the region found in step 17 (Yes in step S18-2), the tuning control unit 123 advances the processing to step S19 to tune to affiliated station $n_j$; when it is determined that the obtained area differs from the region found in step S17 (No in step S18-2), the processing proceeds to step S21 to check the next affiliated station.

Second Embodiment

With the digital broadcast receiver in the first embodiment described above, when there is no switching history information corresponding to the reception service area that was being viewed/listened to, the entire frequency band is scanned to search for a channel with an affiliated station, but the frequency of such scans of the entire receiving frequency band to search for a channel with an affiliated station can be reduced by identifying, from the reception service area of the broadcasting station that was being viewed/listened to until just now, a region (reception service area) adjacent to that region, and identifying, from the affiliated station information, an affiliated broadcasting station in the 'currently receivable state'.

Figure 10:
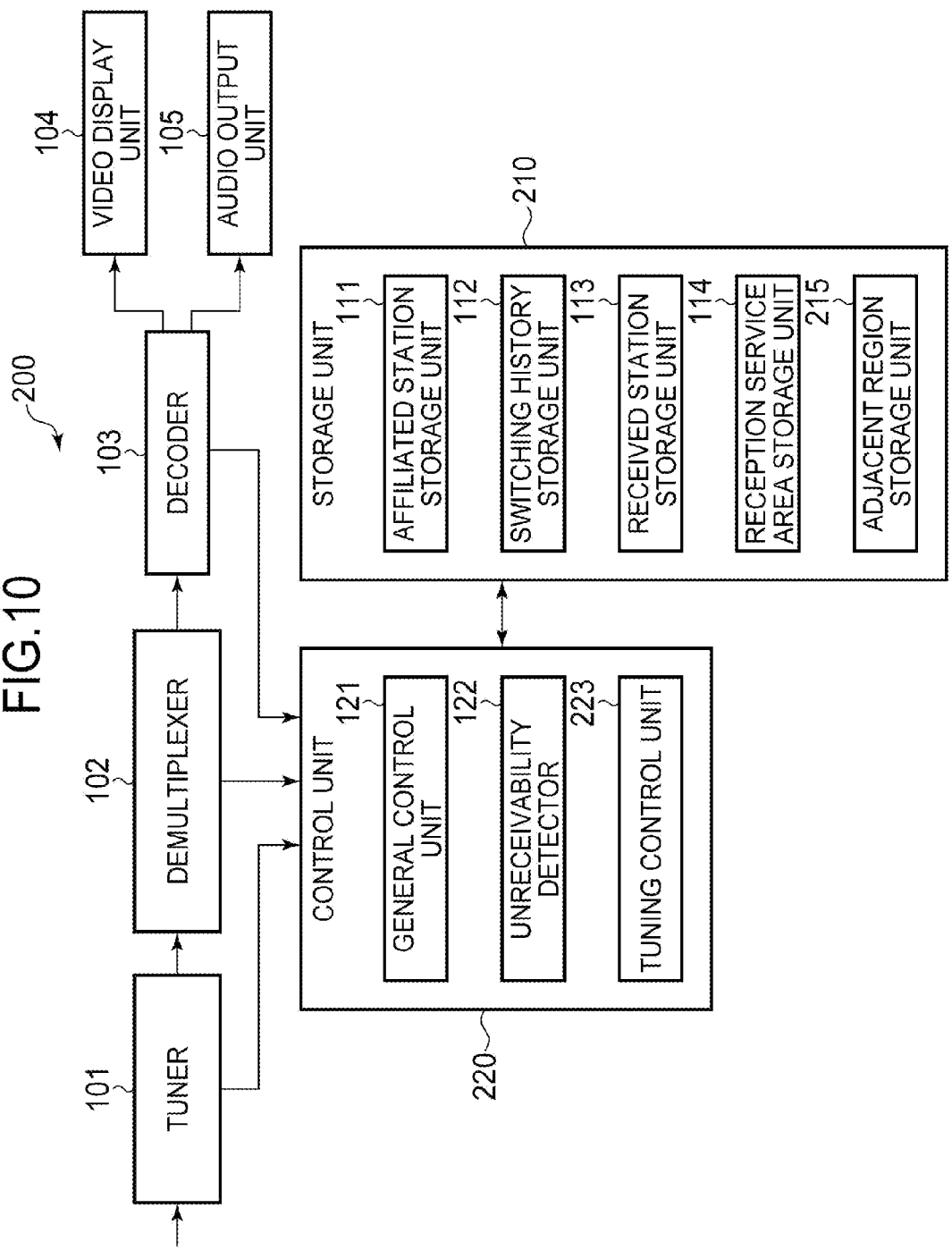
FIG. 10 is a schematic block diagram showing the configuration of a digital broadcast receiver according to a second embodiment.

FIG. 10 is a schematic block diagram showing the configuration of a digital broadcast receiver 200 according to a second embodiment of the present invention. As shown in FIG. 10, the digital broadcast receiver 200 includes a tuner 101, a demultiplexer 102, a decoder 103, a video display unit 104, an audio output unit 105, a storage unit 210, and a control unit 220. The digital broadcast receiver 200 according to the second embodiment differs from the digital broadcast receiver according to the first embodiment in regard to the storage unit 210 and the control unit 220. The following description will accordingly focus on matters concerning the storage unit 210 and control unit 220.

As shown in FIG. 10, the storage unit 210 includes an affiliated station storage unit 111, a switching history storage unit 112, a received station storage unit 113, a reception service area storage unit 114, and an adjacent region storage unit 215. The storage unit 210 differs from the storage unit in the first embodiment in that it includes the adjacent region storage unit 215. The following description will accordingly focus on matters concerning the adjacent region storage unit 215.

The adjacent region storage unit 215 stores adjacent region information identifying reception service areas and their adjacent reception service areas. In the second embodiment, the adjacent region storage unit 215 stores, for example, an adjacent region information table 215a as shown in FIG. 11.

As shown in FIG. 11, the adjacent region information table 215a includes a region column 215b and an adjacent region column 215c.

Information identifying reception service areas is stored in the region column 215b.

Information identifying reception service areas adjacent to the reception service area identified in the region column 215b is stored in the adjacent region column 215c.

Figure 12:
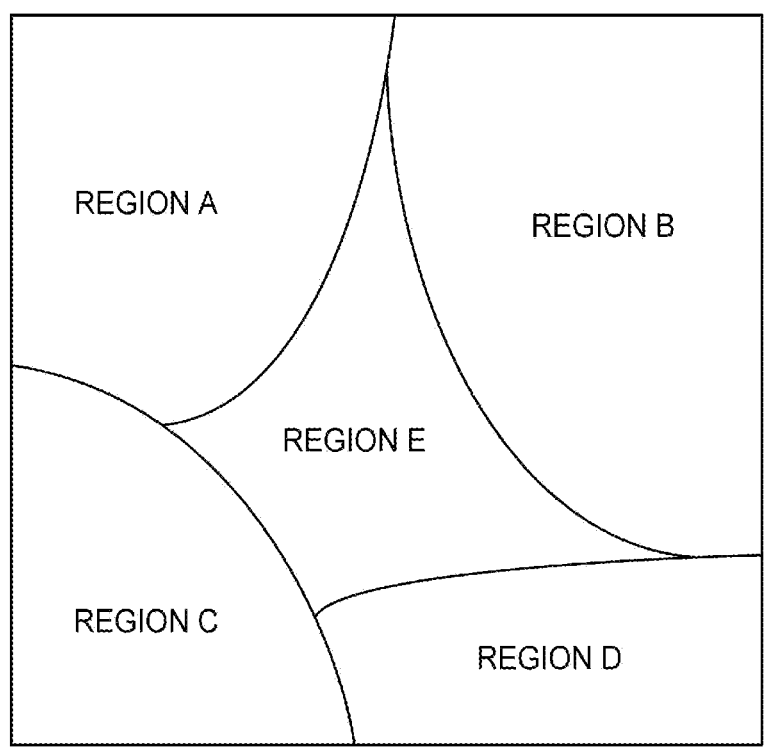
FIG. 12 is a diagram schematically showing a specific example of adjacent areas in the second embodiment.

Adjacent region relationships created beforehand by compiling cartographic adjacency relationships with given regions as shown, for example, in FIG. 12 (which schematically shows specific examples of adjacent regions) are stored in the adjacent region storage unit 215.

Referring again to FIG. 10, the control unit 220 includes a general control unit 121, an unreceivability detector 122, and a tuning control unit 223. The control unit 220 differs from the control unit in the first embodiment in regard to the tuning control unit 223. The following description will accordingly focus on matters concerning the tuning control unit 223.

The tuning control unit 223 stores, in the received station storage unit 113, information (such as channel information) identifying the broadcasting station that broadcast a program that was viewed/listened to, as in the first embodiment. The tuning control unit 123 also stores information identifying the reception service area of the broadcasting station broadcast the program that was viewed/listened to in the reception service area storage unit 114.

When an unreceivability notification is received from the unreceivability detector 122, the tuning control unit 223 obtains from the reception service area storage unit 114 information identifying the reception service area in which the program was, until just now, being received. The tuning control unit 223 then obtains information identifying a reception service area to which the receiver is likely to move, in accordance with the priorities in the motion history column 112c of the record having the obtained reception service area in the present position column 112b in the switching history information table 112a. From the obtained information identifying the reception service area to which the receiver is likely to move and the information identifying the broadcasting station stored in the received station storage unit 113, the tuning control unit 223 then finds whether or not, in the affiliated station storage unit 111, there is an affiliated station of the broadcasting station broadcasting the program being viewed/listened to until just now in the reception service area to which the receiver is likely to move and, if one is present, decides whether the signal received from the affiliated station is receivable. If it is receivable, the tuning control unit 123 commands the tuner 101 to view/listen to the program broadcast by the affiliated station that has been found to be receivable; if it is unreceivable, the tuning control unit 223 then finds whether or not, in the reception service areas adjacent to the reception service area obtained from the reception service area storage unit 114, there is an affiliated station of the broadcasting station broadcasting the program that was being viewed/listened to until just now, and if one is present, decides whether the signal received from the affiliated station is receivable or not. If it is receivable, the tuning control unit 223 commands the tuner 101 to view/listen to the program broadcast by the affiliated station that has been found to be receivable; if it is not receivable, the tuning control unit 223 commands the tuner 101 to scan the channels for another affiliated station.

Figure 13:
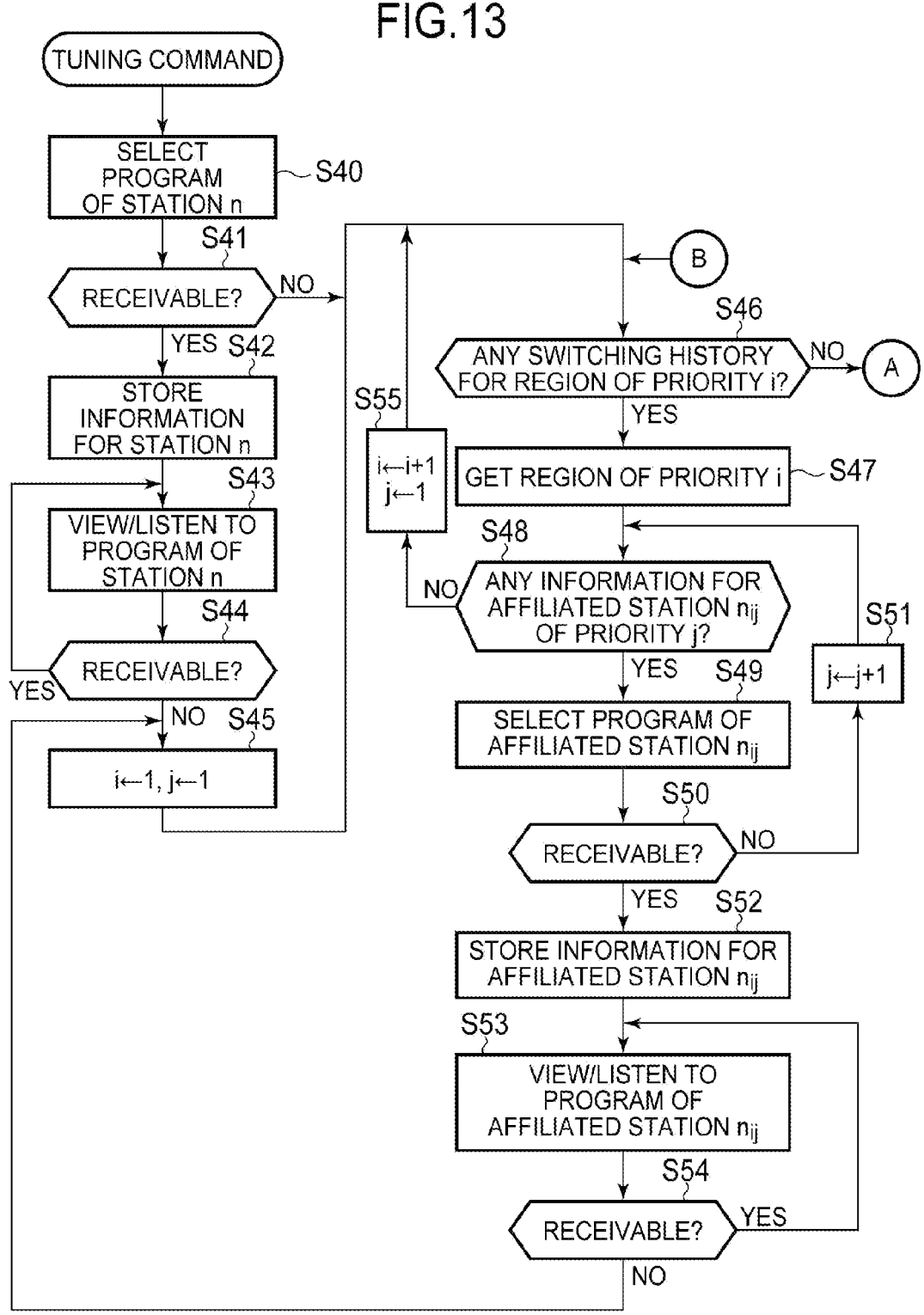
FIG. 13 is the first part of a flowchart illustrating processing in the tuning control unit in the second embodiment.
Figure 14:
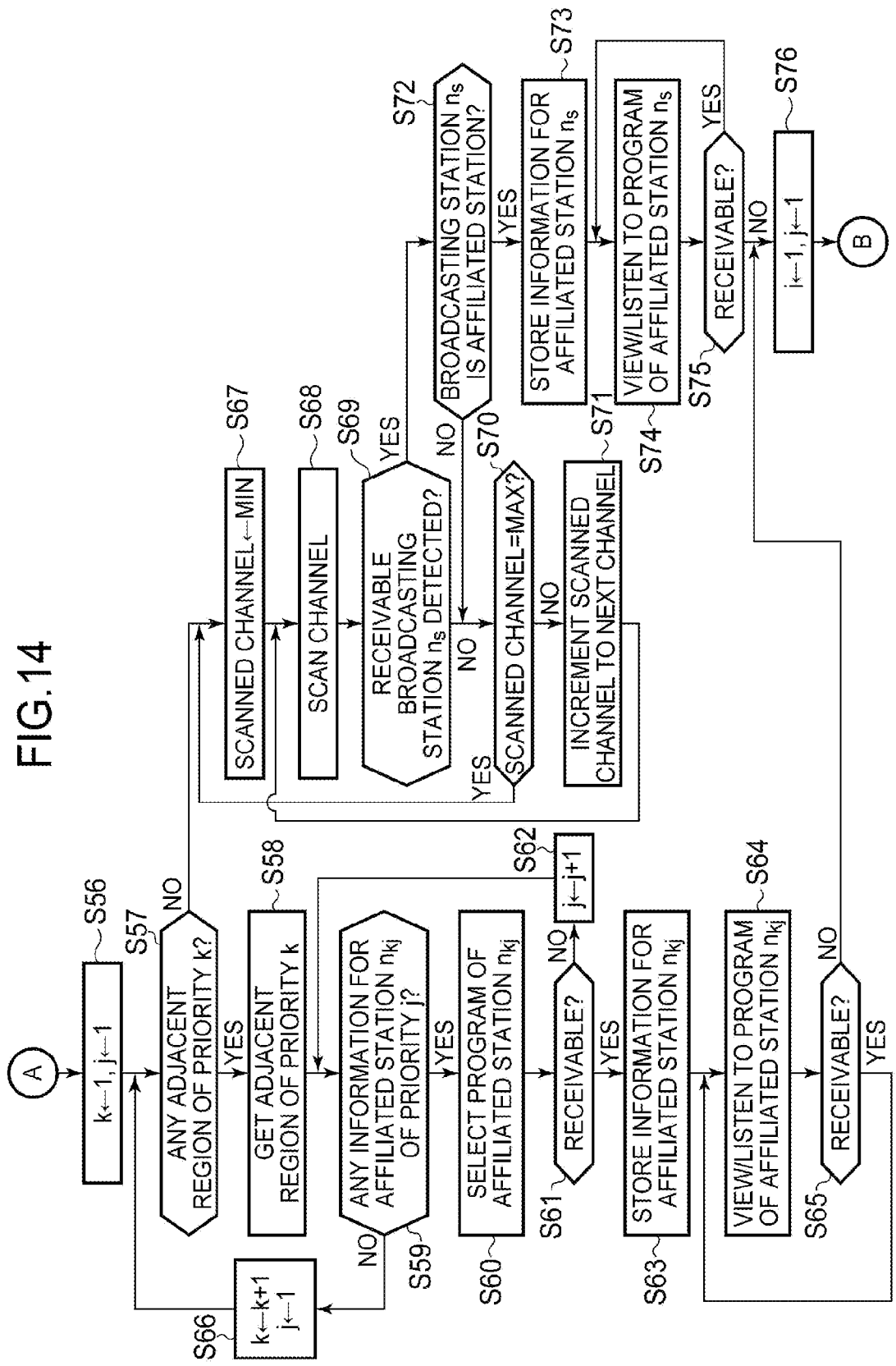
FIG. 14 is the second part of a flowchart illustrating processing in the tuning control unit in the second embodiment.

FIGS. 13 and 14 form a flowchart illustrating processing in the tuning control unit 223 in the digital broadcast receiver 200.

Steps S40 to S55 shown in FIG. 13 are identical to steps S10 to S25 (see FIG. 5) in the first embodiment.

In step S46 in FIG. 13, when information identifying a reception service area having the priority level indicated by index i is not stored (No in step S46), the tuning control unit 223 advances the processing to step S56 in FIG. 14 to make a channel scan to search for an affiliated broadcasting station in an adjacent region.

In step S56, the tuning control unit 223 initializes the index j indicating the priority level of the broadcasting station and an index k indicating the priority level of the adjacent region to 1.

As reception service areas adjacent to a given reception service area, in many cases a plurality of reception service areas are recorded in the adjacent region column 215c as shown in FIG. 11. In obtaining a reception service areas adjacent to the reception service area that was being viewed/listened to, the tuning control unit 223 should therefore set priorities on the plurality of adjacent reception service areas and get the one having the highest priority in the order indicated by the priorities.

Fixed priorities may be set when the adjacent region information table 215a shown in FIG. 11 is created; in the Japanese ISDB-T digital broadcast standard, for example, the priority order may be determined in ascending or descending order of the field value of the region identification code obtained from the service ID, or another order may be specified.

The priority order may be obtained by performing calculations using the switching history information stored in the switching history storage unit 112. For example, when region E has adjacent regions A, B, C, D and when the switching history information table 112a shown in FIG. 3 is stored in the switching history storage unit 112, the regions stored in the motion history column 112c corresponding to region A, the regions stored in the motion history column 112c corresponding to region B, and the regions stored in the motion history column 112c corresponding to region C may be given priority scores such as 10, 9, 8, . . . indicating descending order of priority; the points can be summed up in each region such as 3 for region A, 20 for region B, 18 for region C, and 9 for region D, and the regions can be arranged in descending order of their points as Region B>Region C>Region D>Region A and prioritized in the order of regions B, C, D, A.

In the second embodiment, natural numbers starting from '1' are assigned to priority levels in such a way that a higher number indicates a lower priority.

The tuning control unit 223 then obtains information identifying reception service areas stored in the reception service area storage unit 114, identifies a record in which the obtained information identifying the reception service area is stored in the region column 215b in the adjacent region information table 215a stored in the adjacent region storage unit 215, and checks whether the identified record has a reception service area having the priority level indicated by index k in the adjacent region column 215c (step S57). If information identifying a reception service area having the priority level indicated by index k is stored (Yes in step S57), the tuning control unit 223 advances the processing to step S58; if information identifying a reception service area having the priority level indicated by index k is not stored (No in step S57), the processing proceeds to step S67.

In step S58, the tuning control unit 223 obtains from the adjacent region information table 215a information identifying the reception service area, having the priority level indicated by index k, found in step S57.

The tuning control unit 223 then obtains information identifying broadcasting station stored in the received station storage unit 113 and information identifying reception service area stored in the reception service area storage unit 114, identifies a record having the obtained information identifying the broadcasting station and the reception service area of the broadcasting station in the broadcasting station column 111b, in the affiliated station information table 111a stored in the affiliated station storage unit 111, and checks whether the identified record has a broadcasting station $n_{kj}$ which corresponds to the reception service area obtained in step S58, and has the priority level corresponding to index j, in the affiliated station list column 111c (step S59). If such a broadcasting station $n_{kj}$ is found (Yes in step S59), the tuning control unit 223 advances the processing to step S60. If no such broadcasting station $n_{kj}$ is found (No in step S59), the tuning control unit 223 increments the index k indicating the priority level of the adjacent region by 1, initializes the index j indicating the priority level of the affiliated broadcasting station to 1 (step S66), and returns the processing to step S57.

The tuning control unit 223 then tunes to the broadcasting station $n_{kj}$ found in step S59 (step S60) and decides whether a signal can be received from the tuned broadcasting station $n_{kj}$ (step S61).

When the broadcasting station $n_{kj}$ is currently receivable (Yes in step S61), the tuning control unit 223 advances the processing to step S63. When the broadcasting station $n_{kj}$ is not currently receivable (No in step S61), the tuning control unit 223 increments the index j indicating the priority level of the affiliated broadcasting station by 1 (step S62) and returns the processing to step S59.

In step S63, the tuning control unit 223 stores information identifying broadcasting station $n_{kj}$ in the received station storage unit 113 and stores information identifying the reception service area of broadcasting station $n_{kj}$ in the reception service area storage unit 114. By staying tuned to broadcasting station $n_{kj}$, the tuning control unit 223 enables the user of the digital broadcast receiver 200 to view/listen to the program broadcast by broadcasting station $n_{kj}$ (step S64).

When an unreceivability notification is received from the unreceivability detector 122, the tuning control unit 223 decides that the 'currently receivable state' does not obtain (No in step S65) and advances the processing to step S76.

In step S57, if there is no stored information identifying a reception service area having the priority level indicated by index k (No in step S57), the tuning control unit 223 advances the processing to step S67 to search for a channel with an affiliated broadcasting station by sequentially scanning the entire receiving frequency band. The processing in steps S67 to S76 is identical to the processing in steps S26 to S35 in FIG. 6 in the first embodiment.

In the second embodiment, even when is no stored switching history information for the reception service area that was being viewed/listened to in the switching history storage unit 112, by performing tuning after narrowing down the affiliated station information stored in the affiliated station storage unit 111 in accordance with the reception service area of the station broadcasting the program that was being viewed/listened to, the frequency with which the entire frequency band is scanned to find a channel with an affiliated station can be reduced, and consequently the program viewing/listening interruption time can be shortened.

Third Embodiment

In the first embodiment described above, when there is no switching history information corresponding to a reception service area, the entire frequency band is scanned to search for a channel with an affiliated station, but the time required for carrying out this channel search can be shortened by using the information of the broadcasting station found first in the channel scan.

Figure 15:
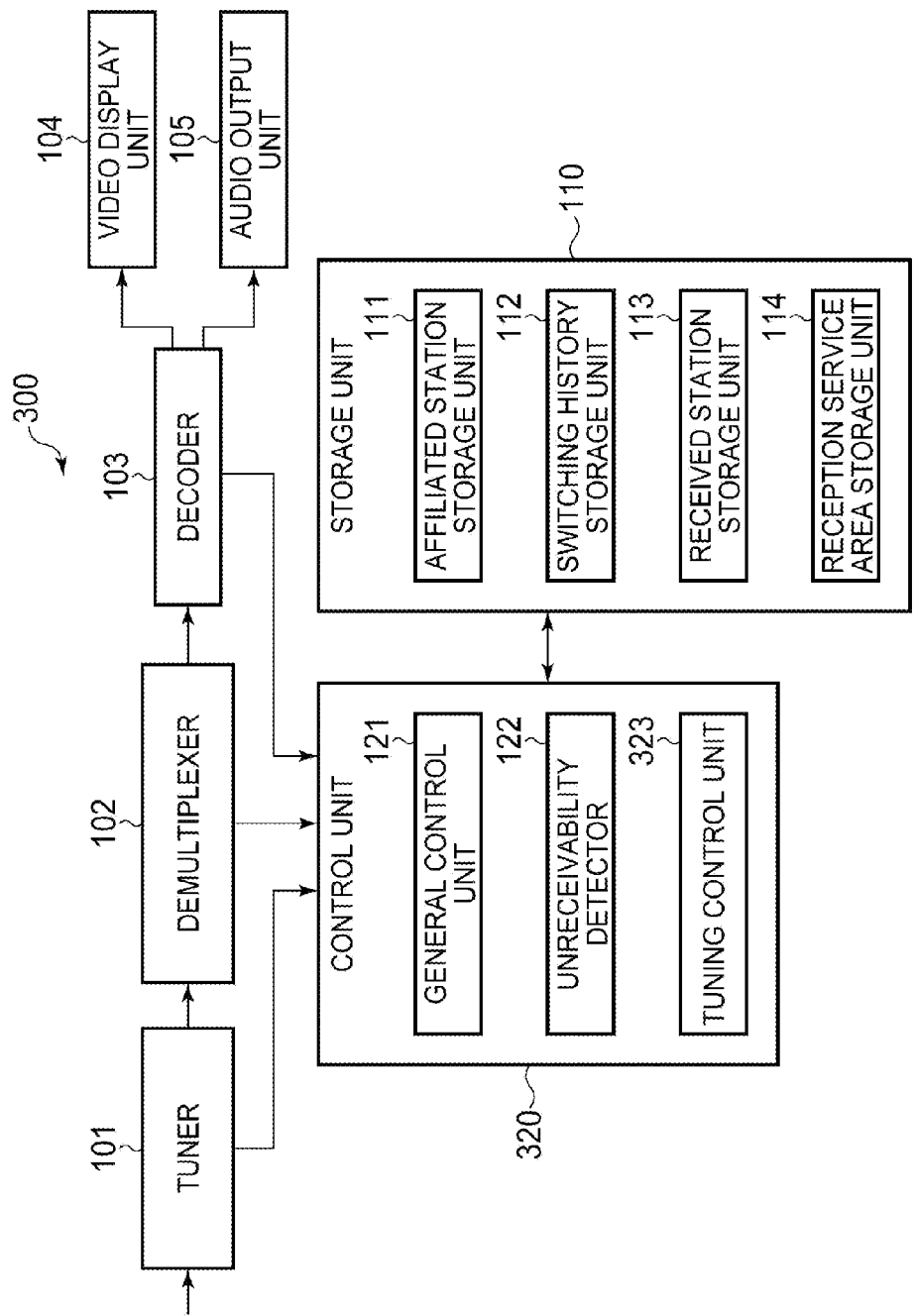
FIG. 15 is a schematic block diagram showing the configuration of a digital broadcast receiver according to a third embodiment.

FIG. 15 is a schematic block diagram showing the configuration of a digital broadcast receiver 300 according to a third embodiment of the present invention. As shown in FIG. 15, the digital broadcast receiver 300 includes a tuner 101, a demultiplexer 102, a decoder 103, a video display unit 104, an audio output unit 105, a storage unit 110, and a control unit 320. The digital broadcast receiver 300 differs from the digital broadcast receiver in the first embodiment in regard to the control performed by the control unit 320. The following description will accordingly focus on matters concerning the control unit 320.

As shown in FIG. 15, the control unit 320 includes a general control unit 121, an unreceivability detector 122, and a tuning control unit 323. This control unit 320 differs from the control unit in the first embodiment in regard to the tuning control unit 323. The following description will accordingly focus on matters concerning the tuning control unit 323.

As in the first embodiment, the tuning control unit 323 stores information (such as channel information) identifying the station broadcasting a program that was viewed/listened to in the received station storage unit 113. The tuning control unit 123 also stores information identifying the reception service area of the station broadcasting the program that was viewed/listened to in the reception service area storage unit 114.

When an unreceivability notification is received from the unreceivability detector 122, the tuning control unit 323 obtains from the reception service area storage unit 114 information identifying the reception service area in which the program was, until just now, being received. The tuning control unit 323 then obtains information identifying a reception service area to which the receiver is likely to move, in accordance with the priorities in the motion history column 112c of the record having the obtained reception service area in the present position column 112b in the switching history information table 112a. From the obtained information identifying the reception service area to which the receiver is likely to move and the information identifying the broadcasting station stored in the received station storage unit 113, the tuning control unit 323 then finds whether or not, in the affiliated station storage unit 111, there is an affiliated station of the broadcasting station broadcasting the program being viewed/listened to until just now in the reception service area to which the receiver is likely to move, and if one is present, decides whether the signal received from the affiliated station is receivable. If it is receivable, the tuning control unit 323 commands the tuner 101 to view/listen to the program broadcast by the affiliated station that has been found to be receivable; if it is unreceivable, the tuning control unit 323 commands the tuner 101 to scan the channels for another affiliated station.

When a broadcasting station that is found to be receivable in a channel scan is not an affiliated station, the tuning control unit 323 obtains information identifying the reception service area of the broadcasting station. Based on the obtained information identifying the reception service area and the information identifying the broadcasting station stored in the received station storage unit 113, the tuning control unit 323 then finds whether an affiliated station of the broadcasting station broadcasting the program that was being viewed/listened to until just now is present in the obtained reception service area and, if one is present, decides whether the signal received from the affiliated station is receivable or not. If it is receivable, the tuning control unit 323 commands the tuner 101 to view/listen to the program broadcast by the affiliated station that is found to be receivable; if it is not receivable, the tuning control unit 323 commands the tuner 101 to scan the channels for another broadcasting station.

Figure 16:
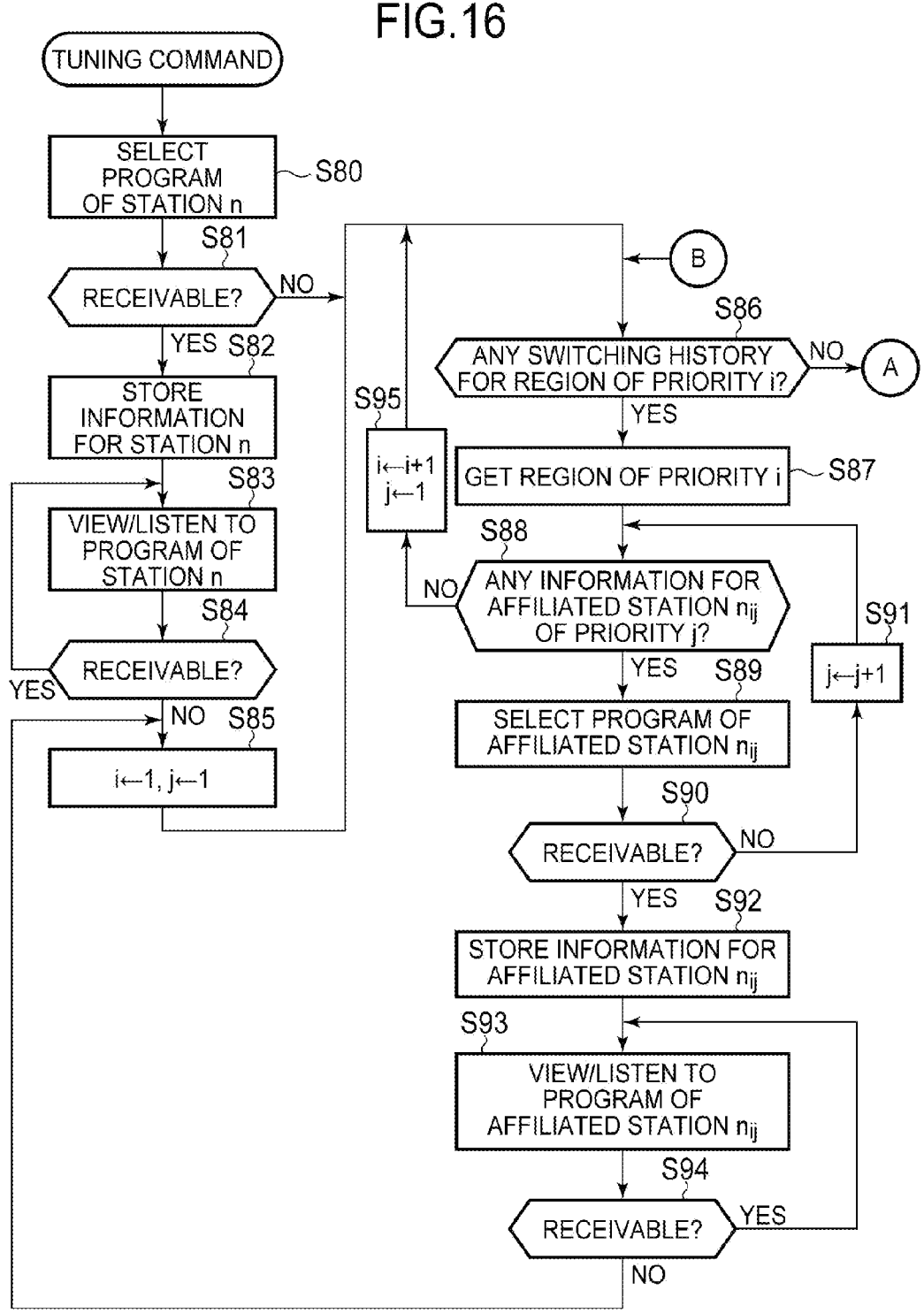
FIG. 16 is the first part of a flowchart illustrating processing in the tuning control unit in the third embodiment.
Figure 17:
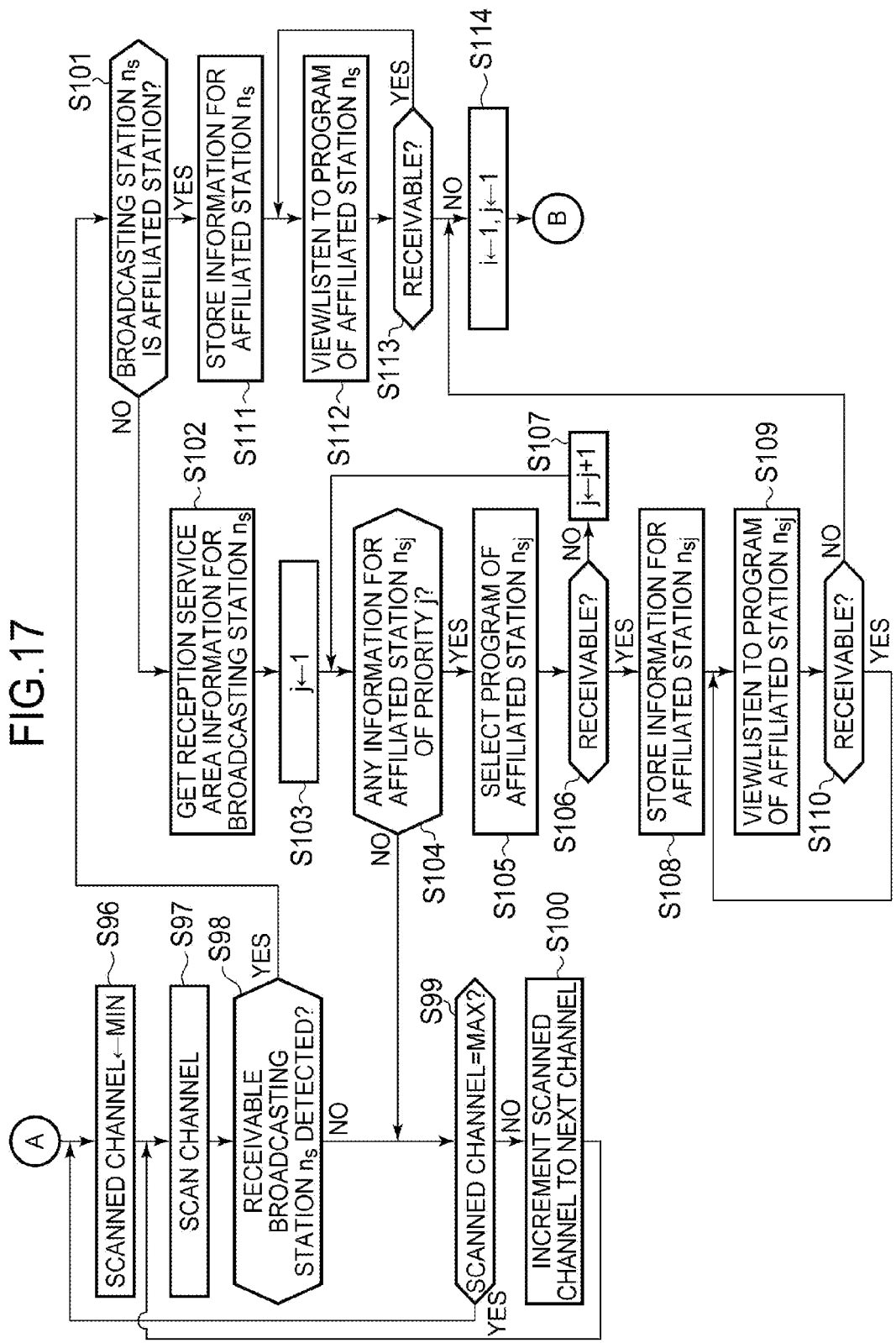
FIG. 17 is the second part of a flowchart illustrating processing in the tuning control unit in the third embodiment.

FIGS. 16 and 17 form a flowchart illustrating processing in the tuning control unit 323 in the digital broadcast receiver 300.

Steps S80 to S95 shown in FIG. 16 are identical to steps S10 to S25 (see FIG. 5) in the first embodiment.

In step S86 in FIG. 16, when information identifying a reception service area having the priority level indicated by index i is not stored (No in step S86), the tuning control unit 323 advances the processing to step S96 in FIG. 17 and sequentially scans the entire band of reception frequencies to search for a channel with an affiliated broadcasting station.

First, in step S96 in FIG. 17, the tuning control unit 323 commands the tuner 101 to set the scanned channel at the channel with the minimum value in the band. The tuning control unit 323 then scans this channel (step S97).

The tuning control unit 323 checks whether or not a receivable broadcasting station $n_s$ is detected by the channel scan (step S98). If a receivable broadcasting station $n_s$ is not detected (No in step S98), the tuning control unit 323 advances the processing to step S99; if a receivable broadcasting station $n_s$ is detected (Yes in step S98), the processing proceeds to step S101.

In step S99, the tuning control unit 323 checks whether or not the channel scanned in step S97 is the channel with the maximum value in the band. If the scanned channel is the channel with the maximum value in the band (Yes in step S99), the tuning control unit 323 returns the processing to step S96; if the scanned channel is not the channel with the maximum value in the band (No in step S99), the tuning control unit 323 moves the scanned channel up by one (+1) (step S100) and then returns the processing to step S97.

When a broadcasting station $n_s$ is detected by the channel scan in step S98 (Yes in step S98), the tuning control unit 323 checks whether the detected broadcasting station $n_s$ is in the same affiliation as the broadcasting station stored in the received station storage unit 113 (step S101). If it is not in the same affiliation (No in step S101), the tuning control unit 323 advances the processing to step S102; if it is in the same affiliation (Yes in step S101), the tuning control unit 323 advances the processing to step S111. Whether the broadcasting station is in the same affiliation may be determined in the same way as in step S31 in the first embodiment.

In step S102, the tuning control unit 323 obtains information, included in the signal received from the broadcasting station $n_s$ detected in step S98, identifying the reception service area.

The tuning control unit 323 then initializes the index indicating the priority level of the broadcasting station to 1 (step S103).

The tuning control unit 323 obtains the information identifying broadcasting station stored in the received station storage unit 113 and the information identifying reception service area stored in the reception service area storage unit 114, identifies a record in which information identifying the obtained broadcasting station and information identifying the reception service area is stored in the broadcasting station column 111b of the affiliated station information table 111a, and checks the identified record to see whether or not there is a broadcasting station $n_{sj}$ that is an affiliated station in the reception service area identified in step S102 (step S104). If there is such a broadcasting station $n_{sj}$ (Yes in step S104), the tuning control unit 323 advances the processing to step S105; if there is no such broadcasting station $n_{sj}$ (No in step S104), the processing proceeds to step S99.

In step S105, the tuning control unit 323 tunes to broadcasting station $n_{sj}$. The tuning control unit 323 then decides whether the signal from the tuned broadcasting station $n_{sj}$ is receivable (step S106), advances the processing to step S108 if broadcasting station $n_{sj}$ is in the 'currently receivable state' (Yes in step S106), and advances the processing to step S107 if broadcasting station $n_{sj}$ is not in the 'currently receivable state' (No in step S106).

In step S108, the tuning control unit 323 obtains information identifying broadcasting station $n_{sj}$ and information identifying the reception service area of broadcasting station $n_{sj}$ from the received signal, stores the obtained information identifying broadcasting station $n_{sj}$ in the received station storage unit 113, and stores the obtained information identifying the reception service area of broadcasting station $n_{sj}$ in the reception service area storage unit 114. By staying tuned to broadcasting station $n_{sj}$, the tuning control unit 323 enables the user of the digital broadcast receiver 300 to view/listen to the program broadcast by broadcasting station $n_{sj}$ (step S109).

When an unreceivability notification is received from the unreceivability detector 122, the tuning control unit 323 decides that the 'currently receivable state' does not obtain (No in step S110) and advances the processing to step S114.

In step S107, the tuning control unit 323 increments the index j indicating the priority level of the affiliated broadcasting station by 1. The tuning control unit 323 then returns the processing to step S104.

In step S101, if the detected broadcasting station $n_s$ is in the same affiliation as the broadcasting station stored in the received station storage unit 113 (Yes in step S101), the tuning control unit 323 advances the processing to step S111.

In step S111, the tuning control unit 323 obtains information identifying broadcasting station $n_s$ and information identifying the reception service area of broadcasting station $n_s$ from the received signal, stores the obtained information identifying broadcasting station $n_s$ in the received station storage unit 113, and stores the obtained information identifying the reception service area of broadcasting station $n_s$ in the reception service area storage unit 114. By staying tuned to broadcasting station $n_s$, the tuning control unit 323 enables the user of the digital broadcast receiver 300 to view/listen to the program broadcast by broadcasting station $n_s$ (step S112).

When an unreceivability notification is received from the unreceivability detector 122, the tuning control unit 323 decides that the 'currently receivable state' does not obtain (No in step S113) and advances the processing to step S114.

In step S114, the tuning control unit 323 initializes the index i indicating the priority level of the reception service area and the index j indicating the affiliated broadcasting station priority level to 1. The tuning control unit 323 then returns the processing to step S86 in FIG. 16.

According to the third embodiment, even though a scan of the entire receiving frequency band is started to search for a channel with an affiliated station when no switching history information for the reception service area in which a broadcast was being received is stored in the switching history storage unit 112, by detecting, from the entire frequency band, one broadcasting station that is in the 'currently receivable state' and using the reception service area of that broadcasting station to tune to a narrowed range of affiliated stations having information stored in the affiliated station storage unit 111, the channel scan can be suspended, an affiliated station can be selected, and consequently, the program viewing/listening interruption time can be shortened.

Variation of the Third Embodiment

Figure 18:
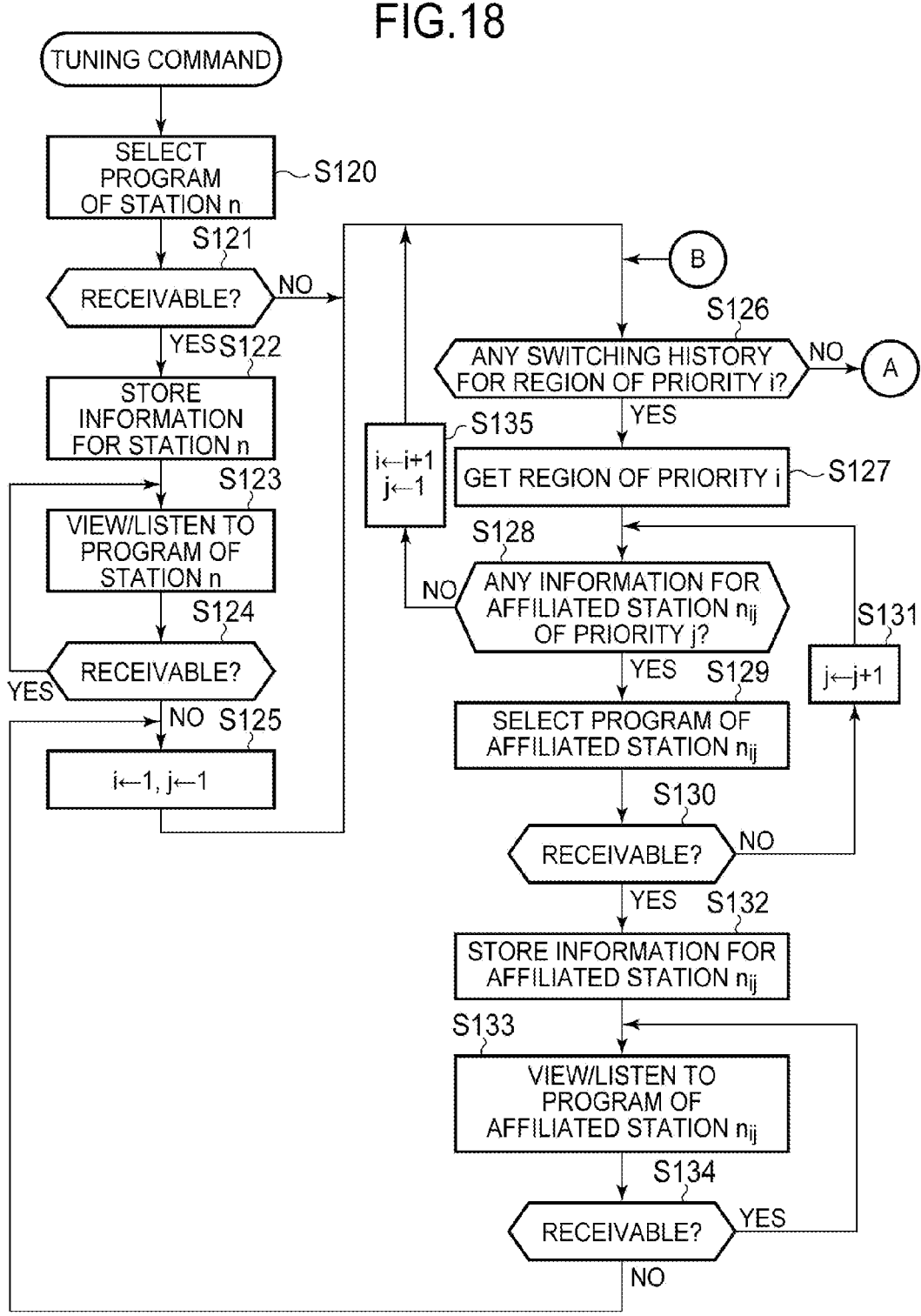
FIG. 18 is the first part of a flowchart illustrating an application of the third embodiment to the second embodiment.
Figure 19:
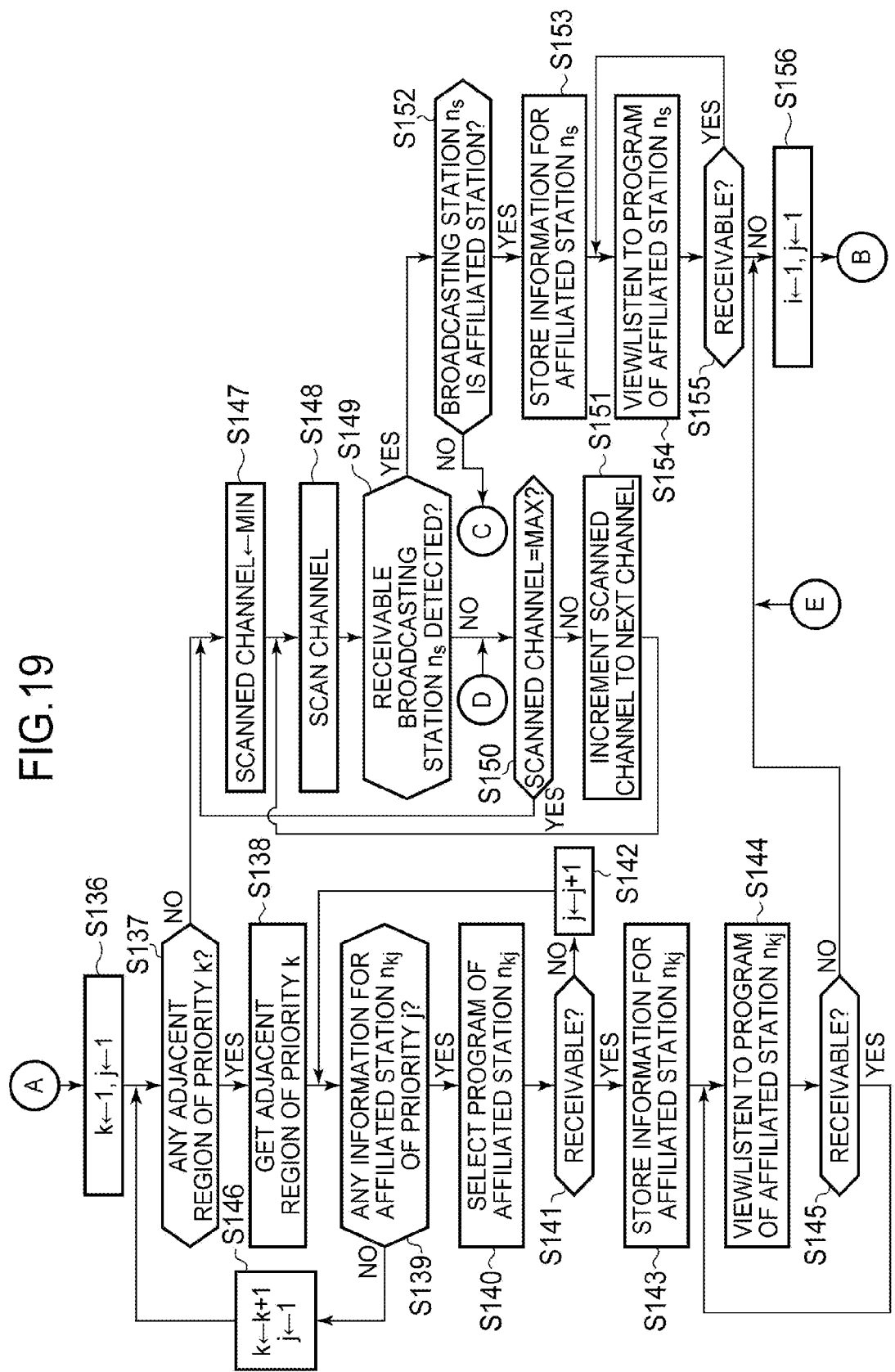
FIG. 19 is the second part of a flowchart illustrating an application of the third embodiment to the second embodiment.
Figure 20:
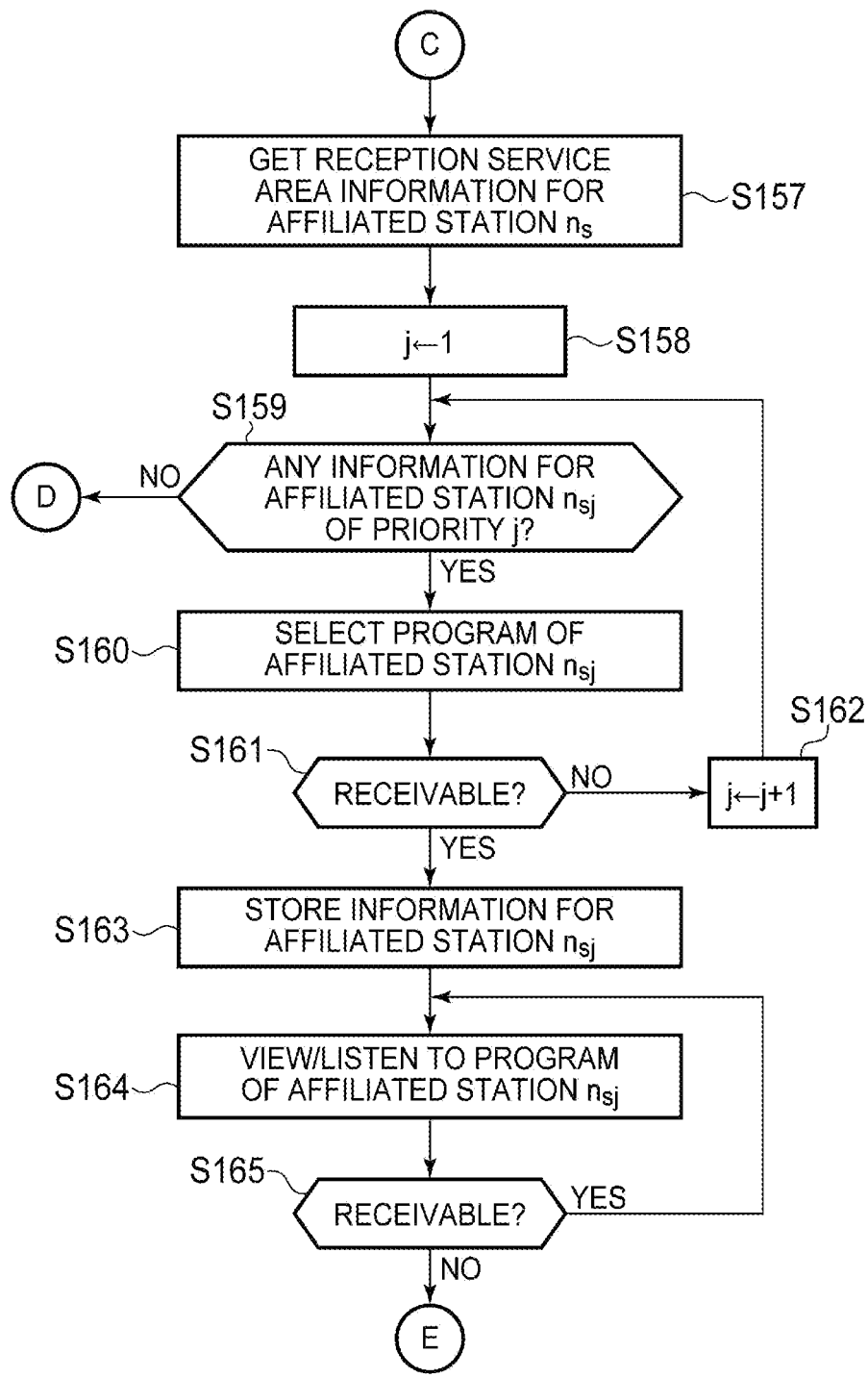
FIG. 20 is the third part of a flowchart illustrating an application of the third embodiment to the second embodiment.

The third embodiment can be applied not only to the first embodiment described above but also to the second embodiment. FIGS. 18 to 20 show a flowchart illustrating an application of the third embodiment to the second embodiment.

Steps S120 to S135 in FIG. 18 are identical to the processing in steps S10 to S25 (see FIG. 5) in the first embodiment. Steps S136 to S156 in FIG. 19 are identical to the processing in steps S56 to S76 (see FIG. 14) in the second embodiment. Steps S157 to S165 in FIG. 20 are identical to steps S102 to S110 (see FIG. 17) in the third embodiment.

In step S152 in FIG. 19, however, when broadcasting station n, is not an affiliated station (No in step S152), the processing proceeds to step S157 in FIG. 20. In step S159 in FIG. 20, if there is no affiliated station $n_{sj}$ corresponding to priority level j (No in step S159), the processing proceeds to step S150 in FIG. 19.

By applying the processing in the third embodiment to the receiving method of the second embodiment, when no affiliated station is found in the adjacent regions and a scan of the entire receiving frequency band has been started to search for a channel with an affiliated station, the channel scan can be suspended, an affiliated station can be selected, and consequently, the program viewing/listening interruption time can be shortened.

Fourth Embodiment

In the first to third embodiments described above, when the digital broadcast receiver is moving near a boundary between two reception service areas, the signal of the broadcasting station that is being viewed/listened to may change frequently from the 'currently receivable state' to the unreceivable state.

Figure 21:
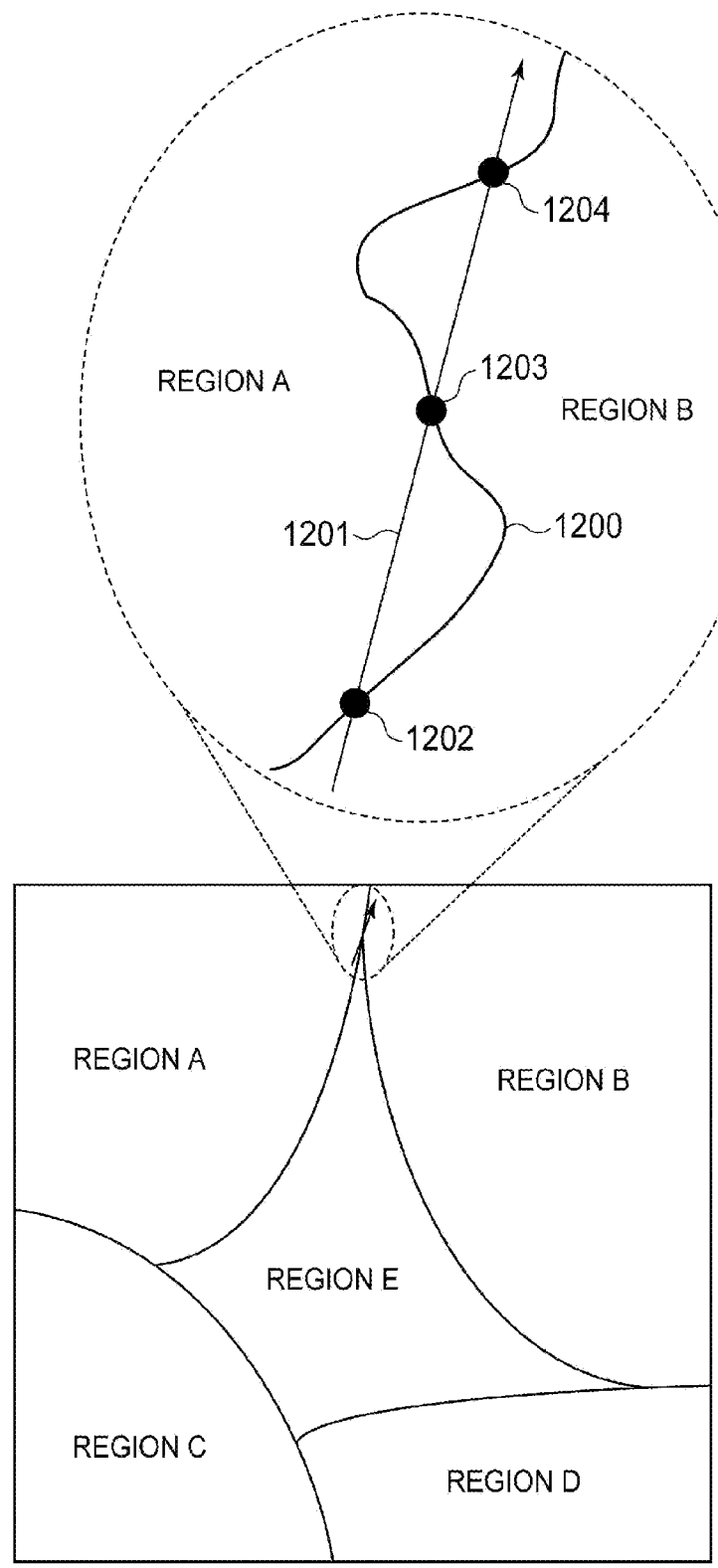
FIG. 21 is a diagram schematically illustrating motion on the boundary between an area A and an area B in a fourth embodiment.

As shown in FIG. 21 (which schematically shows an example of motion on the boundary between a region A and a region B), for example, in motion in a direction 1201 along the boundary 1200 between regions A and B, the digital broadcast receiver first receives signals from a broadcasting station α (region B) while moving in region B, but when it moves through reception service area boundary point 1202 into region A, broadcasting station α (region B) comes into the 'currently unreceivable state', and broadcasting station α (region A), which is an affiliated station that is in the 'currently receivable state' in region A, is tuned in by the procedure described above.

When the receiver moves from region A through the next reception service area boundary point 1203 into region B, broadcasting station α (region A) comes into the 'currently unreceivable state' and the procedure described above again tunes to broadcasting station α (region B), which is an affiliated station in the 'currently receivable state' in region B; then similar operations are repeated at the next reception service area boundary point 1204.

Switching occurs from region A to region B at boundary point 1203, and from region B to region A at boundary points 1202 and 1204, but if a switching history information table 112a like the one shown in FIG. 3 is stored in the switching history storage unit 112, region B can be obtained from region A at boundary point 1203 from the switching history information table 112a, so broadcasting station α (region B) can also be tuned in by the first to third embodiments described above.

At boundary points 1202 and 1204, since region A has lower priority than region B in the switching history information table 112a, it takes time to get region A.

In a fourth embodiment, the reception service area which was tuned in last is stored, so even in motion near the boundary between two reception service areas, a quick switch can be made between affiliated stations.

Figure 22:
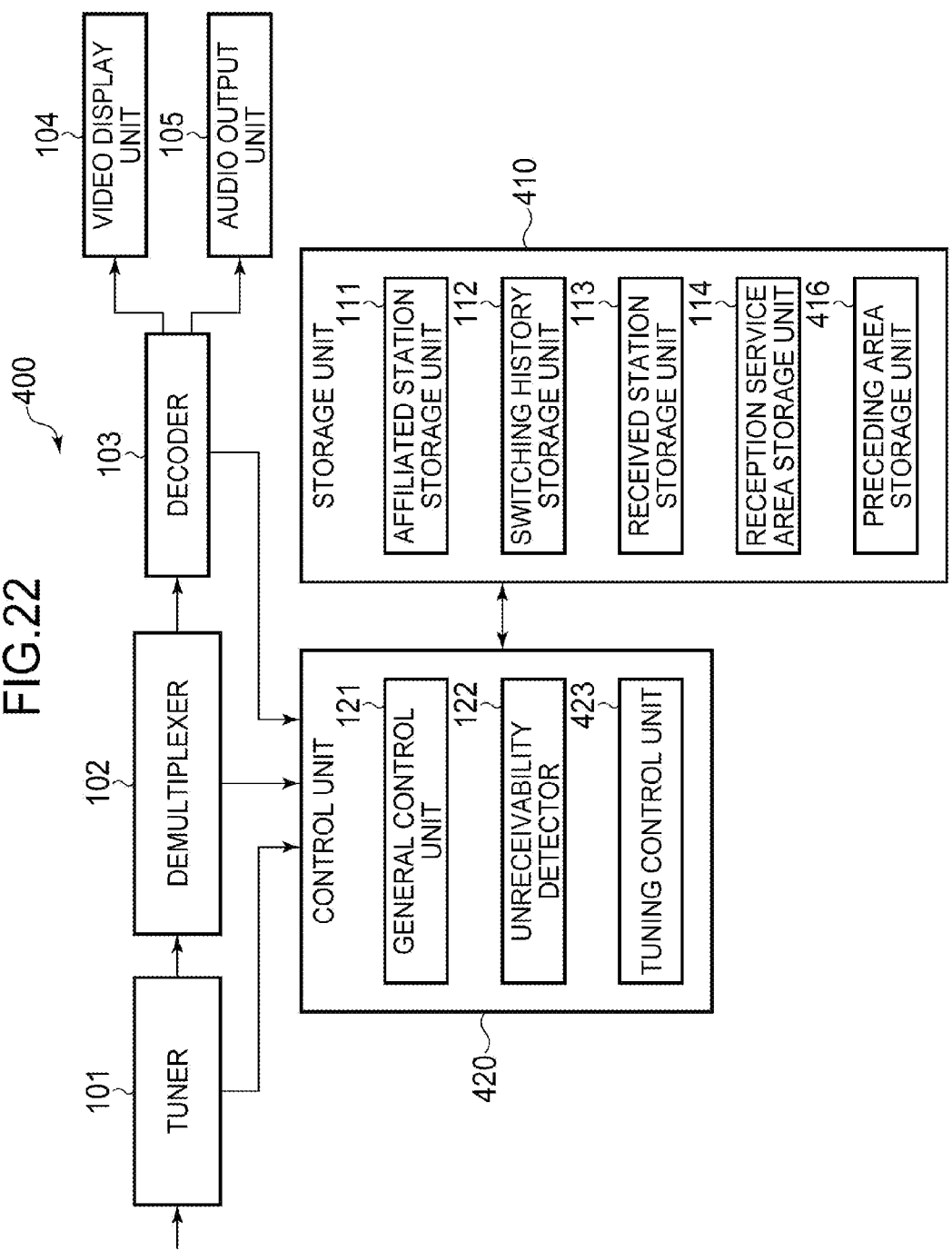
FIG. 22 is a schematic block diagram showing the configuration of a digital broadcast receiver according to the fourth embodiment.

FIG. 22 is a schematic block diagram showing the configuration of a digital broadcast receiver 400 according to the fourth embodiment of the present invention. As shown in FIG. 22, the digital broadcast receiver 400 includes a tuner 101, a demultiplexer 102, a decoder 103, a video display unit 104, an audio output unit 105, a storage unit 410, and a control unit 420. This digital broadcast receiver 400 differs from and the receiver in the first embodiment in regard to the storage unit 410 and the control unit 420. The following description will accordingly focus on matters concerning the storage unit 410 and control unit 420.

As shown in FIG. 22, the storage unit 410 includes an affiliated station storage unit 111, a switching history storage unit 112, a received station storage unit 113, a reception service area storage unit 114, and a preceding area storage unit 416. The 410 differs from the storage unit in the first embodiment in that it includes the preceding area storage unit 416. The following description will accordingly focus on matters concerning the preceding area storage unit 416.

The preceding area storage unit 416 stores preceding area information identifying the reception service area of the broadcasting station now tuned in and the reception service area of the broadcasting station tuned in the previous time. A preceding area information table 416a like the one shown in FIG. 23, for example, is stored in the fourth embodiment.

Figure 23:
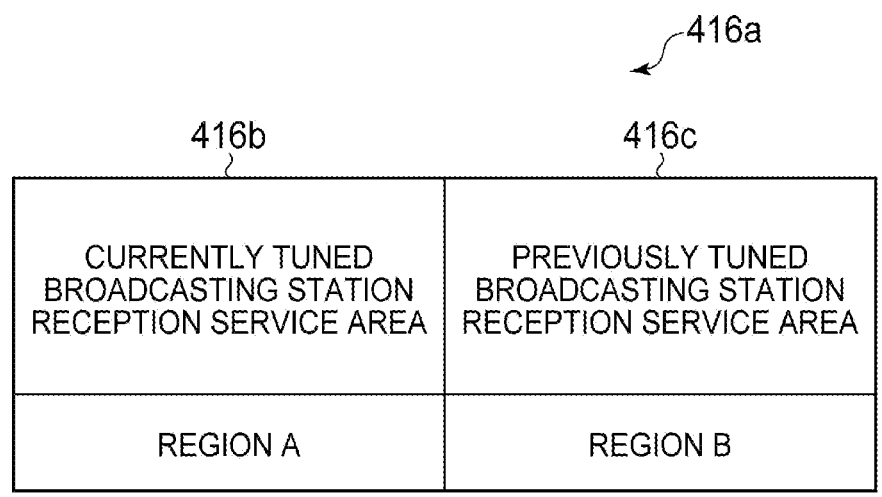
FIG. 23 is a diagram schematically showing a preceding area information table in the fourth embodiment.

As shown in FIG. 23, the preceding area information table 416a includes a currently tuned broadcasting station service area column 416 and a previously tuned broadcasting station service area column 416c.

The currently tuned broadcasting station service area column 416 contains information identifying the reception service area of the broadcasting station to which the digital broadcast receiver 400 is now tuned.

The previously tuned broadcasting station service area column 416c contains information identifying the reception service area of the broadcasting station to which the digital broadcast receiver 400 was tuned before the reception service area identified in the currently tuned broadcasting station service area column 416.

The control unit 420 includes a general control unit 121, an unreceivability detector 122, and a tuning control unit 423. The control unit 420 differs from the first embodiment in regard to the tuning control unit 423. The following description will accordingly focus on matters concerning the tuning control unit 423.

In addition to performing the same processing as in the first embodiment, each time the broadcasting station being viewed/listened to is switched, the tuning control unit 423 stores information identifying the reception service area of the switched-to broadcasting station in the currently tuned broadcasting station service area column 416b, and stores information identifying the reception service area of the switched-to broadcasting station in the previously tuned broadcasting station service area column 416c, of the preceding area information table 416a.

When an unreceivability notification is received from the unreceivability detector 122, the tuning control unit 423 determines whether or not the digital broadcast receiver 400 is in the vicinity of the preceding reception service area; if the digital broadcast receiver 400 is determined to be in the vicinity of the preceding reception service area, the tuning control unit 423 searches for an affiliated station in the preceding reception service area, and if the signal from such an affiliated station is receivable, it switches the tuning to the affiliated station.

Figure 24:
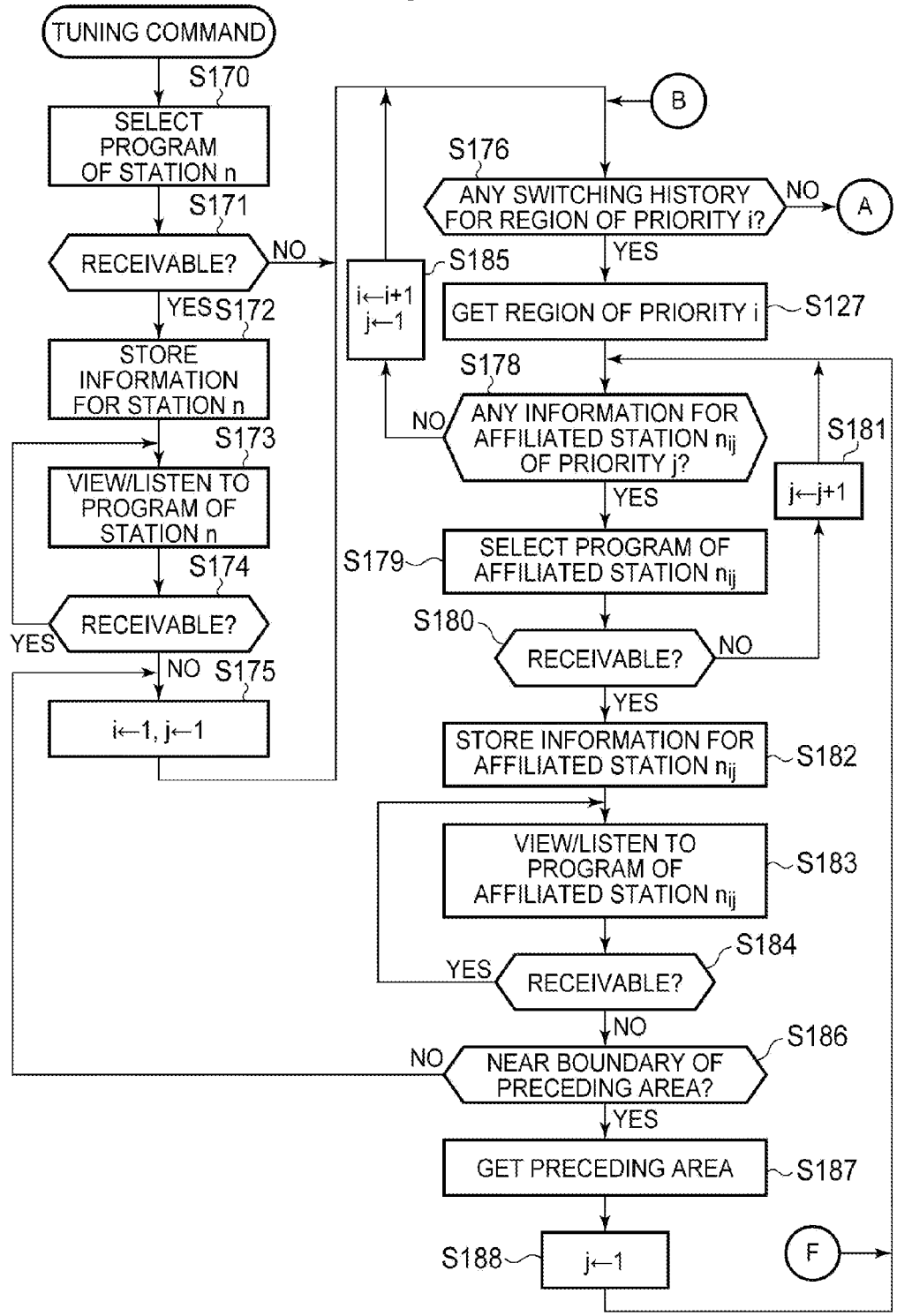
FIG. 24 is the first part of a flowchart illustrating processing in the tuning control unit in the fourth embodiment.
Figure 25:
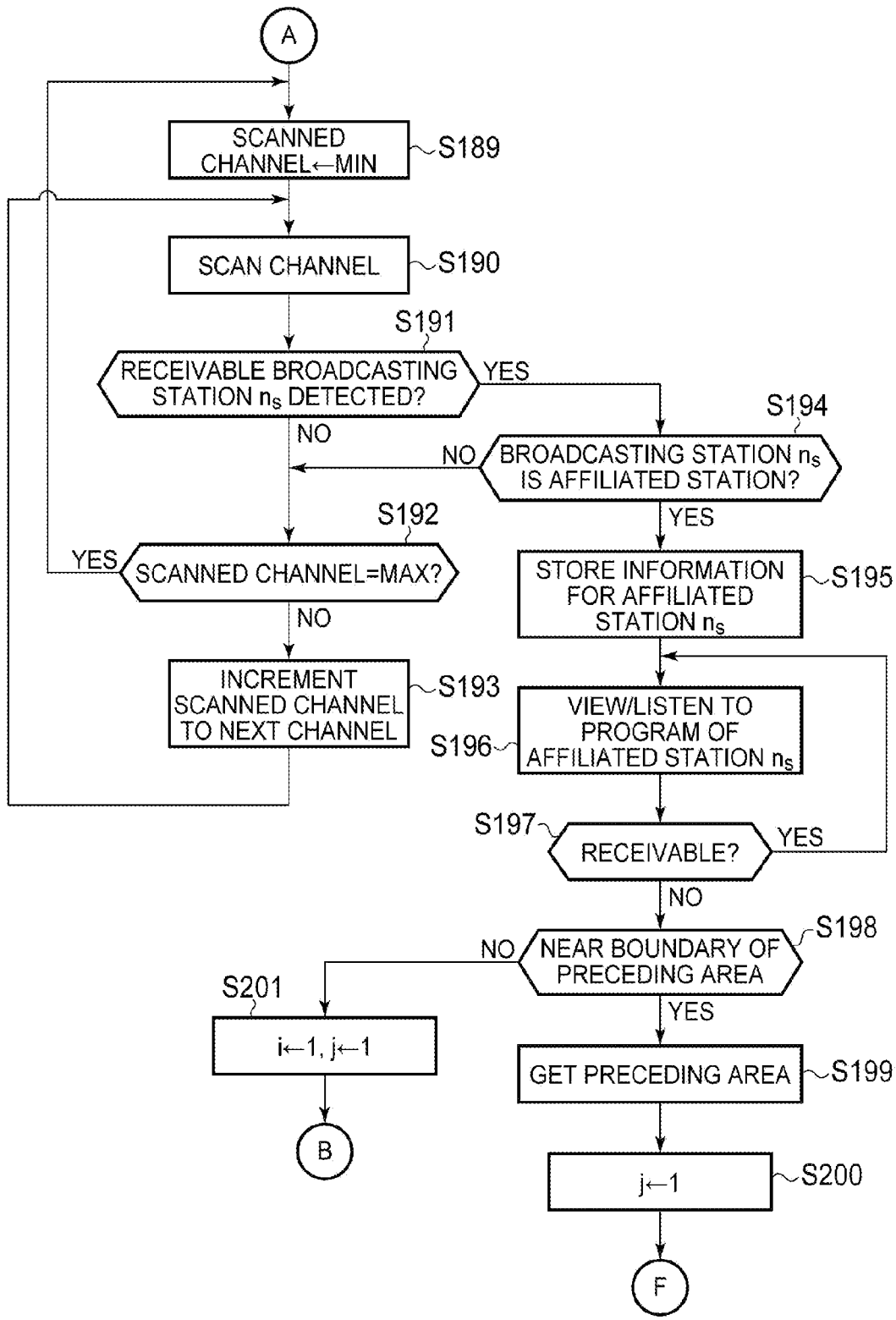
FIG. 25 is the second part of a flowchart illustrating processing in the tuning control unit in the fourth embodiment.

FIGS. 24 and 25 form a flowchart illustrating processing in the tuning control unit 423 in the digital broadcast receiver 400.

Steps S170 to S185 shown in FIG. 24 are identical to steps S10 to S25 (see FIG. 5) in the first embodiment. In steps S172 and S182, however, the tuning control unit 423 stores information identifying the reception service area of the switched-to broadcasting switching in the currently tuned broadcasting station service area column 416 and stores information identifying the reception service area of the switched-from broadcasting station in the previously tuned broadcasting station service area column 416c, in the preceding area information table 416a. In step S184, when an unreceivability notification is received from the unreceivability detector 122, the tuning control unit 423 decides that the 'currently receivable state' does not obtain (No in step S184) and advances the processing to step S186.

In step S186, the tuning control unit 423 decides whether or not it is in the vicinity of the boundary of the preceding area. The tuning control unit 423 then advances the processing to step S187 if it decides it is in the vicinity of the boundary of the preceding area (Yes in step S186), and to step S175 if it decides it is not in the vicinity of the boundary of the preceding area (No in step S186).

The tuning control unit 423 has obtained the reception state of the signal received from affiliated station $n_j$ from the unreceivability detector 122; if the 'currently nearly unreceivable state' has not changed to the 'currently unreceivable state' even once after the switch to affiliated station $n_{ij}$, it decides that it is in the vicinity of the boundary of the preceding area; if the 'currently nearly unreceivable state' has changed to the 'currently unreceivable state' even once after the switch to affiliated station $n_{ij}$, it decides that it is not in the vicinity of the boundary of the preceding area.

In step S187, the tuning control unit 423 obtains from the previously tuned broadcasting station service area column 416c of the preceding area information table 416a information identifying the reception service area of the switched-from broadcasting station. The tuning control unit 423 then initializes the index j indicating the priority level of the affiliated station to 1 (step S188), returns the processing to step S178, and searches for an affiliated station in the reception service area of the switched-from broadcasting station.

In step S176, when information identifying a reception service area having the priority level indicated by index i is not stored (No in step S176), the tuning control unit 423 advances the processing to step S189 in FIG. 25 and makes a sequential channel scan through the entire receiving frequency band to search for an affiliated broadcasting station.

The processing from step S189 to step S197 is identical to the processing from step S26 to step S34 (see FIG. 6) in the first embodiment. In step S197, when an unreceivability notification is received from the unreceivability detector 122, the tuning control unit 423 decides that the 'currently receivable state' does not obtain (No in step S197) and advances the processing to step S198.

In step S198, the tuning control unit 423 decides whether or not it is in the vicinity of the boundary of the preceding area. The tuning control unit 423 then advances the processing to step S199 if it decides it is in the vicinity of the preceding area (Yes in step S198), and to step S201 if it decides it is not in the vicinity of the preceding area (No in step S198).

In step S199, the tuning control unit 423 obtains information identifying the reception service area of the switched-from broadcasting station from the previously tuned broadcasting station service area column 416c of the preceding area information table 416a. The tuning control unit 423 then initializes the index j indicating the priority level of the affiliated station to 1 (step S200), returns the processing to step S178 in FIG. 24, and searches for an affiliated station in the reception service area of the switched-from broadcasting station.

In step S201, the tuning control unit 423 initializes indexes i and j to 1. The tuning control unit 423 then returns the processing to step S176 in FIG. 24.

According to the fourth embodiment, when the vicinity of the boundary of the reception service area of the tuned-in affiliated station is the boundary of the reception service area of the broadcasting station viewed/listened to previously and the tuned-in affiliated station comes into the 'currently unreceivable state', affiliated stations are searched for preferentially in the reception service area of the broadcasting station viewed/listened to previously. Therefore, in the fourth embodiment, even when the received signal is unstable in the vicinity of the reception area boundary, a broadcasting station in the 'currently receivable state' can be detected, the frequency with which the entire frequency band is scanned to search for a channel with an affiliated station can be reduced, and consequently the program viewing/listening interruption time can be shortened.

The fourth embodiment described above is an example of a receiving method applied to the first embodiment, but such is not a limitation; the method can be similarly applied to the second and third embodiments.

REFERENCE CHARACTERS 100, 200, 300, 400: digital broadcast receiver, 101: tuner, 102: demultiplexer, 103: decoder, 104: video display unit, 105: audio output unit, 110, 210, 410: storage unit, 111: affiliated station storage unit, 112: switching history storage unit, 113: received station storage unit, 114: reception service area storage unit, 215: adjacent region storage unit, 416: preceding area storage unit, 120, 220, 320, 420: control unit, 121: general control unit, 122: unreceivability detector, 123, 223, 323, 423: tuning control unit.

What is claimed is:
1. A digital broadcast receiver comprising:
an affiliated station storage unit that, in further association with affiliated station information associating broadcasting stations with their affiliated stations, stores tuning information, obtained from broadcast signals from the broadcasting stations and the affiliated stations and needed for tuning to the respective broadcasting stations, and reception service areas to which the respective broadcasting stations are broadcasting, the reception service areas also being obtained from the broadcast signals from the broadcasting stations and the affiliated stations;

a switching history storage unit for storing a motion history of past movement among the reception service areas obtained from the broadcast signals and, in association with each of the reception service areas, switching history information associated with a priority order indicating where, from a given reception service area, the digital broadcast receiver is likely to move next, based on the motion history; and a tuning control unit for tuning to one of the broadcasting stations or one of the affiliated stations in order to receive a program, and obtaining information with which the reception service area of the tuned-in broadcasting station or affiliated station can be inferred;

wherein when a received signal becomes currently unreceivable due to motion from a reception service area of one of the broadcasting stations broadcasting a currently viewed/listened to program to another reception service area, the tuning control unit:

infers, from the switching history information, a present location to which the digital broadcast receiver is likely to have moved, performs a reception service area inference process to infer a reception service area at the inferred present location, performs an affiliated station identification process to identify, from the affiliated station information for affiliated stations receivable in the inferred present location, one of the affiliated stations corresponding to the broadcasting station broadcasting the currently viewed/listened to program, which can be tuned in within the reception service area of the inferred present location, and preferentially tunes to the affiliated station receivable in the inferred present location as identified by the affiliated station identification process.

2. The digital broadcast receiver of claim 1, further comprising an adjacent region storage unit for storing adjacent region information in which information identifying a given reception service area is associated with information identifying other reception service areas adjacent to that reception service area, wherein:

when the identified affiliated station cannot be tuned in, the tuning control unit:

performs an adjacent reception service area inference process to infer, on a basis of the adjacent region information, an adjacent reception service area adjacent to a reception service area of the broadcasting station broadcasting the currently viewed/listened to program, performs a receivable-in-adjacent-region affiliated station identification process to identify, from the affiliated station information, an affiliated station of the broadcasting station broadcasting the currently viewed/listened to program, which can be tuned in within the inferred adjacent reception service area, as an affiliated station receivable in the adjacent region, and preferentially tunes to the affiliated station receivable in the adjacent region identified by the receivable-in-adjacent-region affiliated station identification process.

3. The digital broadcast receiver of claim 2, wherein:

when the identified affiliated station in the currently receivable state cannot be tuned in or when the receivable affiliated station in the adjacent region in the currently receivable state cannot be tuned in, the tuning control unit:

performs a channel search process to detect a broadcasting station in the currently receivable state by sequentially scanning untuned channels, when the broadcasting station in the currently receivable state found in the channel search process is not an affiliated station of the broadcasting station broadcasting the currently viewed/listened to program, performs a current reception service area inference process in which a reception service area obtained from a signal received from the broadcasting station in the currently receivable state, found in the channel search process, is inferred to be a current reception service area, and performs a receivable-in-current-region affiliated station identification process to identify, from the affiliated station information, an affiliated station of the broadcasting station broadcasting the currently viewed/listened to program, which can be tuned in within the inferred current reception service area, as an affiliated station receivable in the current region, and preferentially tunes to the affiliated station receivable in the current region as identified by the receivable-in-current-region affiliated station identification process.

4. The digital broadcast receiver of claim 1, further comprising:

a preceding reception service area storage unit for storing information indicating a reception service area broadcast to by the broadcasting station tuned in last as a preceding reception service area, wherein:

when, after a switch to an affiliated station, the received signal thereof becomes currently unreceivable, the tuning control unit:

if the currently receivable state has not occurred even once after the switch to the affiliated station, performs a preceding reception service area boundary vicinity decision process to decide whether the current position is included in a boundary portion between the reception service area of the currently tuned-in broadcasting station and the preceding reception service area, if the preceding reception service area boundary vicinity decision process decides that the current position is included in the boundary portion, obtains the preceding reception service area from the preceding reception service area storage unit, performs a preceding receivable affiliated station identification process to identify, from the affiliated station information, an affiliated station of the tuned-in broadcasting station within the preceding reception service area as a preceding receivable affiliated station, and preferentially tunes to the preceding receivable affiliated station information as identified by the preceding receivable affiliated station identification process.

5. The digital broadcast receiver of claim 1, wherein the value of a region identification code obtained from an sv_id value in an NIT/SDT/PAT section in a PSI/SI or the value of an area_code field included in a terrestrial delivery system descriptor transmitted in the NIT section is used as information determining the reception service area.

6. The digital broadcast receiver of claim 1, wherein values of an original_network_id and a network_id are used as information determining the reception service area.

7. A digital broadcast receiving method comprising:
storing in an affiliated station storage means, in further association with affiliated station information associating broadcasting stations with their affiliated stations, tuning information needed for tuning to the broadcasting stations and the affiliated stations and reception service areas to which the respective broadcasting stations are broadcasting;
storing, in a switching history storage means, a motion history of past movement among the reception service areas and, in association with each of the reception service areas, switching history information associated with a priority order indicating where, from a given reception service area, the digital broadcast receiver is likely to move next, based on the motion history; and
tuning to one of the broadcasting stations or one of the affiliated stations in order to receive a program, and obtaining information with which the reception service area of the tuned-in broadcasting station or affiliated station can be inferred, including:
when a received signal becomes currently unreceivable due to motion from a reception service area of one of the broadcasting stations broadcasting a currently viewed/listened to program to another reception service area,
inferring, from the switching history information, a present location to which the digital broadcast receiver is likely to have moved,
performing a service area inference process to infer one of the reception service areas corresponding to the inferred present location,
performing an affiliated station identification process to identify, from the affiliated station information for affiliated stations receivable in the inferred present location, one of the affiliated stations corresponding to the broadcasting station broadcasting the currently viewed/listened to program, which can be tuned in within the reception service area of the inferred present location, and
preferentially tuning to the affiliated station receivable in the inferred present location as identified by the affiliated station identification process.

8. The digital broadcast receiving method of claim 7, further comprising:
storing adjacent region information in which information identifying a given reception service area is associated with information identifying other reception service areas adjacent to that reception service area, in an adjacent region storage means; and
when the identified affiliated station receivable cannot be tuned in,
performing an adjacent reception service area inference process to infer, on a basis of the adjacent region information, an adjacent reception service area adjacent to a reception service area of the broadcasting station broadcasting the currently viewed/listened to program;
performing a receivable-in-adjacent-region affiliated station identification process to identify, from the affiliated station information, an affiliated station of the broadcasting station broadcasting the currently viewed/listened to program, which can be tuned in within the inferred adjacent reception service area, as an affiliated station receivable in the adjacent region; and
preferentially tuning to the affiliated station receivable in the adjacent region identified by the receivable-in-adjacent-region affiliated station identification process.

9. The digital broadcast receiving method of claim 8, wherein:
when the identified affiliated station in the currently receivable state cannot be tuned in or when the receivable affiliated station in the adjacent region in the currently receivable state cannot be tuned in, in the tuning control step,
a channel search process is performed to detect a broadcasting station in the currently receivable state by sequentially scanning untuned channels,
when the broadcasting station in the currently receivable state found in the channel search process is not an affiliated station of the broadcasting station broadcasting the currently viewed/listened to program, a current reception service area inference process is performed in which a reception service area obtained from a signal received from the broadcasting station in the currently receivable state, found in the channel search process, is inferred to be the current reception service area,
a receivable-in-current-region affiliated station identification process is performed to identify, from the affiliated station information, an affiliated station of the broadcasting station broadcasting the currently viewed/listened to program, which can be tuned in within the inferred current reception service area, as an affiliated station receivable in the current region, and
the affiliated station receivable in the current region, as identified by the receivable-in-current-region affiliated station identification process, is preferentially tuned to.

10. The digital broadcast receiving method of claim 7, further comprising:
storing information indicating the reception service area broadcast to by the broadcasting station tuned in last as a preceding reception service area, in a preceding reception service area storage means; and
when the received signal becomes currently unreceivable after a switch to an affiliated station,
if the currently unreceivable state has never occurred after the switch to the affiliated station, a preceding reception service area boundary vicinity decision process is performed to decide whether the current position is included in a boundary portion between the reception service area of the currently tuned-in broadcasting station and the preceding reception service area,
if the preceding reception service area boundary vicinity decision process decides that the current position is included in the boundary portion, the preceding reception service area is obtained from the preceding reception service area storage means,
a preceding receivable affiliated station identification process is performed to identify, from the affiliated station information, an affiliated station of the tuned-in broadcasting station within the preceding reception service area as a preceding receivable affiliated station, and tuning is preferentially performed to the preceding receivable affiliated station information as identified by the preceding receivable affiliated station identification process.

11. The digital broadcast receiving method of claim 7, wherein the value of a region identification code obtained from an sv_id value in an NIT/SDT/PAT section in a PSI/SI or the value of an area_code field included in a terrestrial delivery system descriptor transmitted in the NIT section is used as information determining the reception service area.

12. The digital broadcast receiving method of claim 7, wherein values of an original_network_id and a network_id are used as information determining the reception service area.

* * * * *